United States Patent [19]

Vittorelli

[11] 4,212,077

[45] Jul. 8, 1980

[54] TEXT PROCESSING SYSTEM FOR DISPLAYING AND EDITING A LINE OF TEXT

[75] Inventor: Vittore Vittorelli, Ivrea, Italy

[73] Assignee: Ing. C. Olivetti & C., S.p.A., Irea, Italy

[21] Appl. No.: 831,530

[22] Filed: Sep. 8, 1977

[30] Foreign Application Priority Data

Sep. 22, 1976 [IT] Italy ............................... 69270 A/76

[51] Int. Cl.$^{2}$ .......................... G06F 3/02; G06F 3/10; G06F 3/14

[52] U.S. Cl. ..................................................... 364/900

[58] Field of Search ... 364/200 MS File, 900 MS File; 400/83, 84, 85

[56] References Cited

U.S. PATENT DOCUMENTS

| | | | |
|---|---|---|---|
| 3,328,764 | 6/1967 | Sorenson et al. | 364/200 |
| 3,501,746 | 3/1970 | Vosbury | 364/900 |
| 3,610,902 | 10/1971 | Rahenkamp et al. | 364/200 |
| 3,618,032 | 11/1971 | Goldsberry | 364/900 |
| 3,675,208 | 7/1972 | Bard | 364/900 |
| 3,760,375 | 9/1973 | Irwin et al. | 364/200 |
| 3,786,429 | 1/1974 | Goldman et al. | 364/900 |
| 3,815,104 | 6/1974 | Goldman | 364/200 |
| 3,848,232 | 11/1974 | Leibler et al. | 364/200 |
| 3,915,278 | 10/1975 | Spence et al. | 364/900 X |
| 4,016,365 | 4/1977 | Staar | 400/83 |
| 4,028,538 | 7/1977 | Olander, Jr. et al. | 364/900 |
| 4,041,467 | 8/1977 | Cota et al. | 364/900 |

*Primary Examiner*—Harvey E. Springborn
*Attorney, Agent, or Firm*—Schuyler, Birch, McKie & Beckett

[57] ABSTRACT

A text processing system comprises a keyboard, a printing unit, a display unit having the capacity of displaying up to a line of entered text and a control unit which updates the display unit upon each entry of a character from the keyboard, and enables the printing unit to print the last entered line upon reception of an end of line signal from the keyboard. An auxiliary buffer is provided for storing the line last entered via the keyboard. The keyboard includes a line preceding key operative during entry of a line on the keyboard for conditioning the display unit to display at least a portion of the line of text stored in the auxiliary buffer.

18 Claims, 45 Drawing Figures

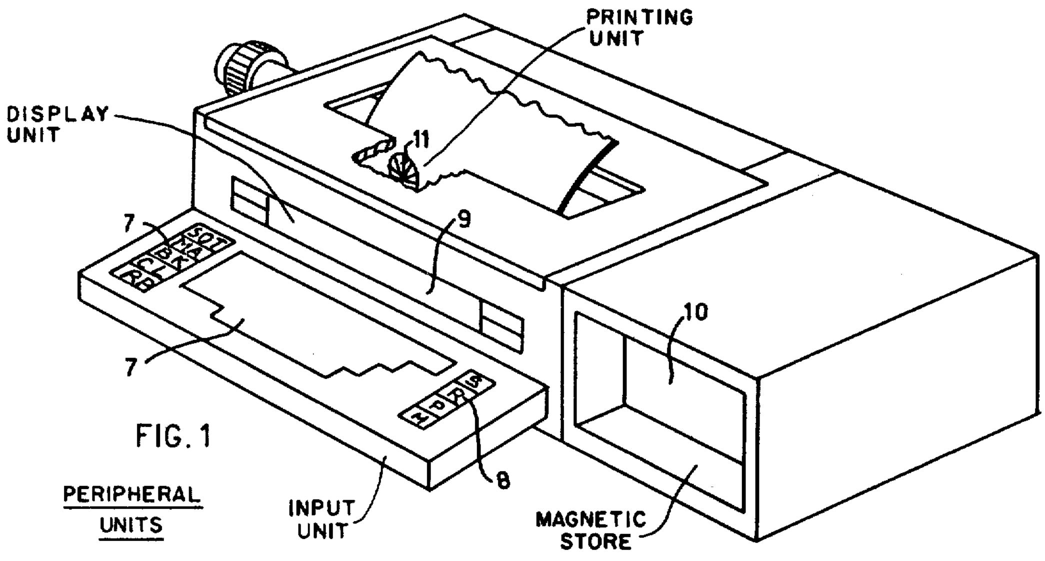
FIG. 1
FIG. 4
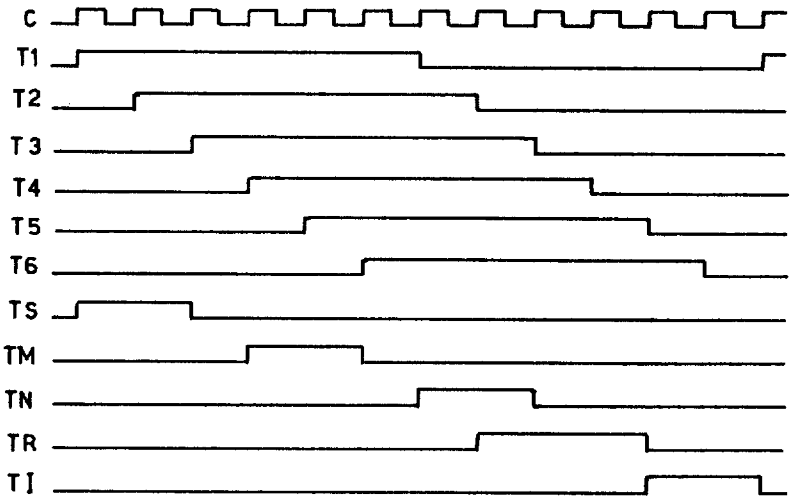
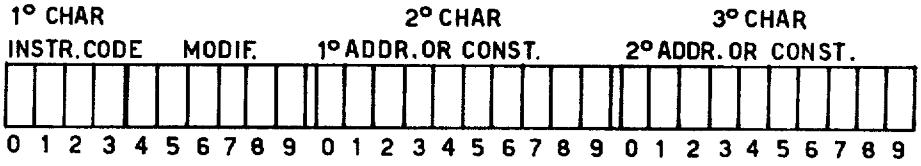
FIG. 6

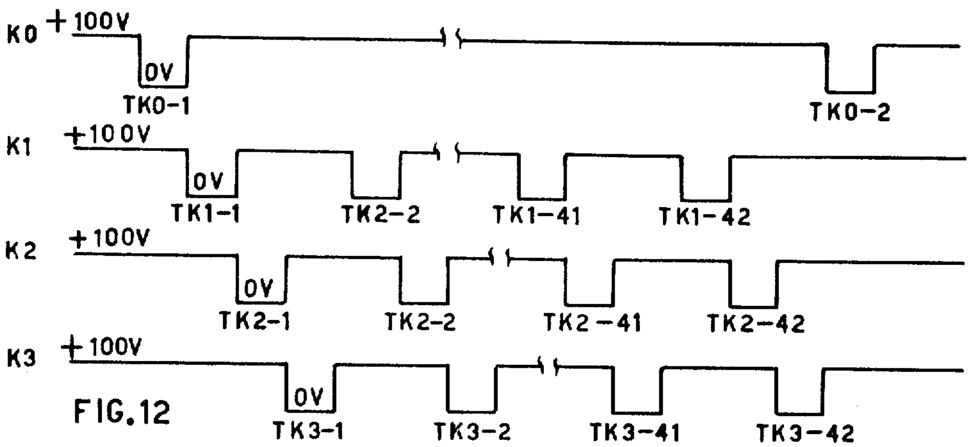
FIG. 12
FIG. 15
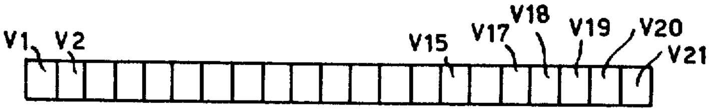
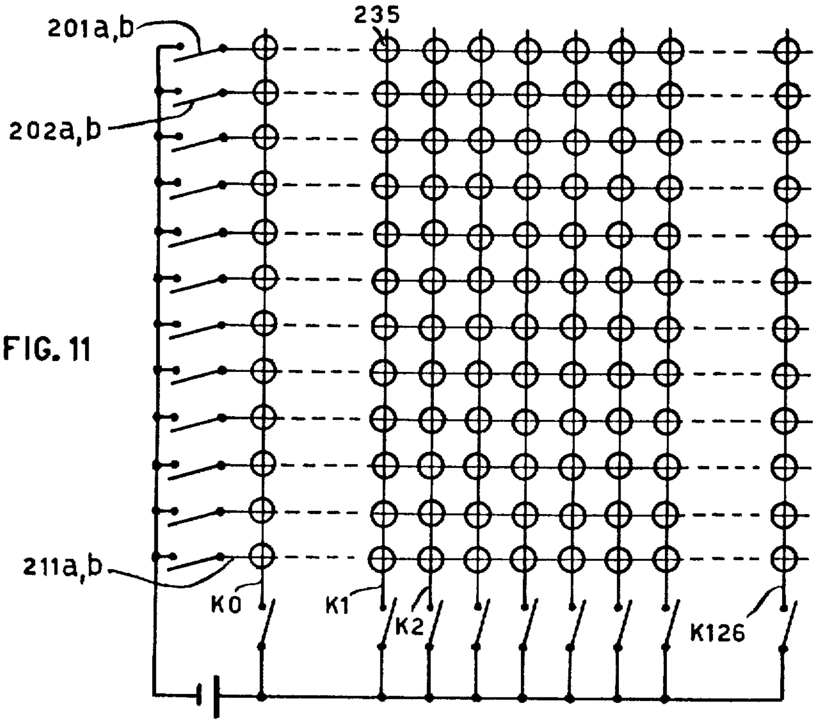
FIG. 11

DISPLAY CONTROL UNIT

FIG. 21
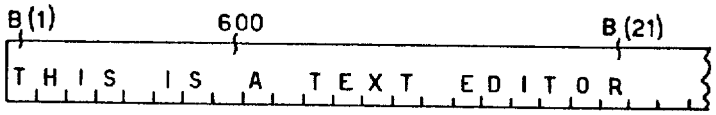
FIG. 21a
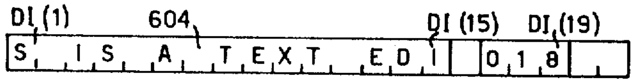
FIG. 21b
FIG. 21c
FIG. 21d
FIG. 21e
FIG. 21f
FIG. 21g
FIG. 21h
FIG. 21i
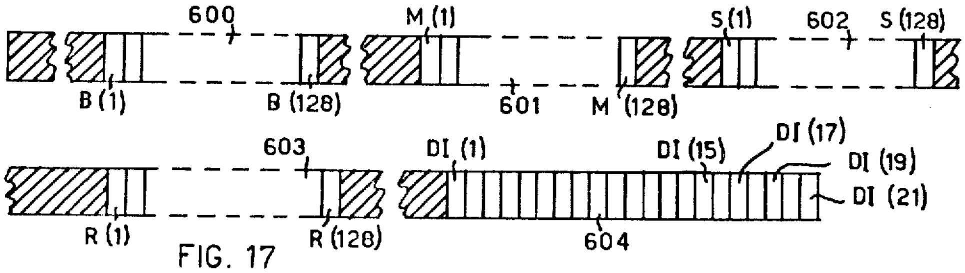
FIG. 17

TEXT PROCESSING SYSTEM FOR DISPLAYING AND EDITING A LINE OF TEXT

BACKGROUND OF THE INVENTION

The present invention relates to a system for automatically processing the contents as well as the format of a text and for printing the same. The system comprises a character input unit, a printing unit for printing the characters in different printing lines, a memory unit to store the entered characters, a display unit and a central unit to control the input, memory, printing and display units.

In a text processing system, a particular requirement is to obtain the first draft without mistakes and properly formatted, particularly when the processing time for revising the first draft is equivalent to the time for retyping this same draft, especially when it refers to a non-standard letter or to a short text. Text processing systems are known in the prior art, represented by U.S. Pat. No. 3,815,104 and U.S. Pat. No. 3,501,746, in which these requirements are fulfilled by providing the text processing system with a page display unit and with a page operation memory on which a page of text entered from the keyboard is displayed and temporarily stored before printing for purposes of revisions. Such a provision considerably increases the cost and the dimensions of the machine. It also has the disadvantage of not allowing the operator to command the print of one page of text while entering a new page of text, since the operating memory has the capacity of only one page. The further provision of an operating memory having the capacity of temporarily storing two pages of the text, one being printed and the other displayed, would again considerably increase the cost of the system.

SUMMARY OF THE INVENTION

An object of the present invention is therefore that of providing a text processing system in which it is possible to edit a text without any typing or paging mistakes during the first typing thereof and in which there is no loss of typing rhythem for the operator without any need for the expensive page display units of the prior art as described above. Thus, it is an object of the present invention to provide a text processing system for displaying lines of text rather than an entire page of text in order to overcome the disadvantages of the prior art page display units.

The writing system according to the invention comprises a line memory, a single line display unit and a printing memory and is characterized by a control unit for modifying the content of the line memory during the entry of characters from the keyboard into the line memory, in accordance with modification commands entered via the keyboard. During the entry of a line of a text, the control unit updates the single line display unit with the last characters and modifications introduced on the keyboard. An end-of-line signal is entered via the keyboard to transfer the content of the line-memory to the printer memory and to enable concurrently via the keyboard the introduction of a new line of text into the line memory, and printing of the line stored in the printer memory.

These and other characteristics of the present invention will result clearly from the following description, with reference to the accompanying drawings of which:

BRIEF DESCRIPTION OF THE DRAWINGS

FIG. 1 is a prospective view of the text processing system according to the invention.

FIG. 4 is a diagram of the timing signals of the central unit of FIG. 3.

FIG. 6 is a diagram indicating the structure of the instructions used by the central unit of FIG. 3.

FIG. 11 is an electrical connection diagram for the display.

FIG. 12 is a timer diagram for the display of FIG. 9–11.

FIG. 15 is a schematic view of the display cells.

FIG. 17 is a partial map of the operating memory 42.

FIG. 21, 21*e*, 21*f*, 21*h*, relate to the different contents of the input buffer 600.

FIG. 21*a*, 21*b*, 21*c*, 21*d*, 21*g*, 21*i* relate to different contents of the display buffer.

DESCRIPTION OF THE PREFERRED EMBODIMENT INDEX

Introduction
Central Unit
Organization of the operating memory
Programme organization and instruction list
Execution of instructions
Interrupt Control
Keyboard
Keyboard control unit
Display
Display control unit
Magnetic tape memory control unit
Printer control unit
Recording programme
Display buffer updating subroutine
Display control subroutine
MA Shift forward key execution subroutine
Subroutine of a character code insertion into the input buffer
BK Back-space key execution subroutine
CL Cancel key execution subroutine
Underlining execution subroutine
RC Key execution subroutine
Principal Recording Program
Printing state-hyphenation routine of the printing program

INTRODUCTION

Figure 2:
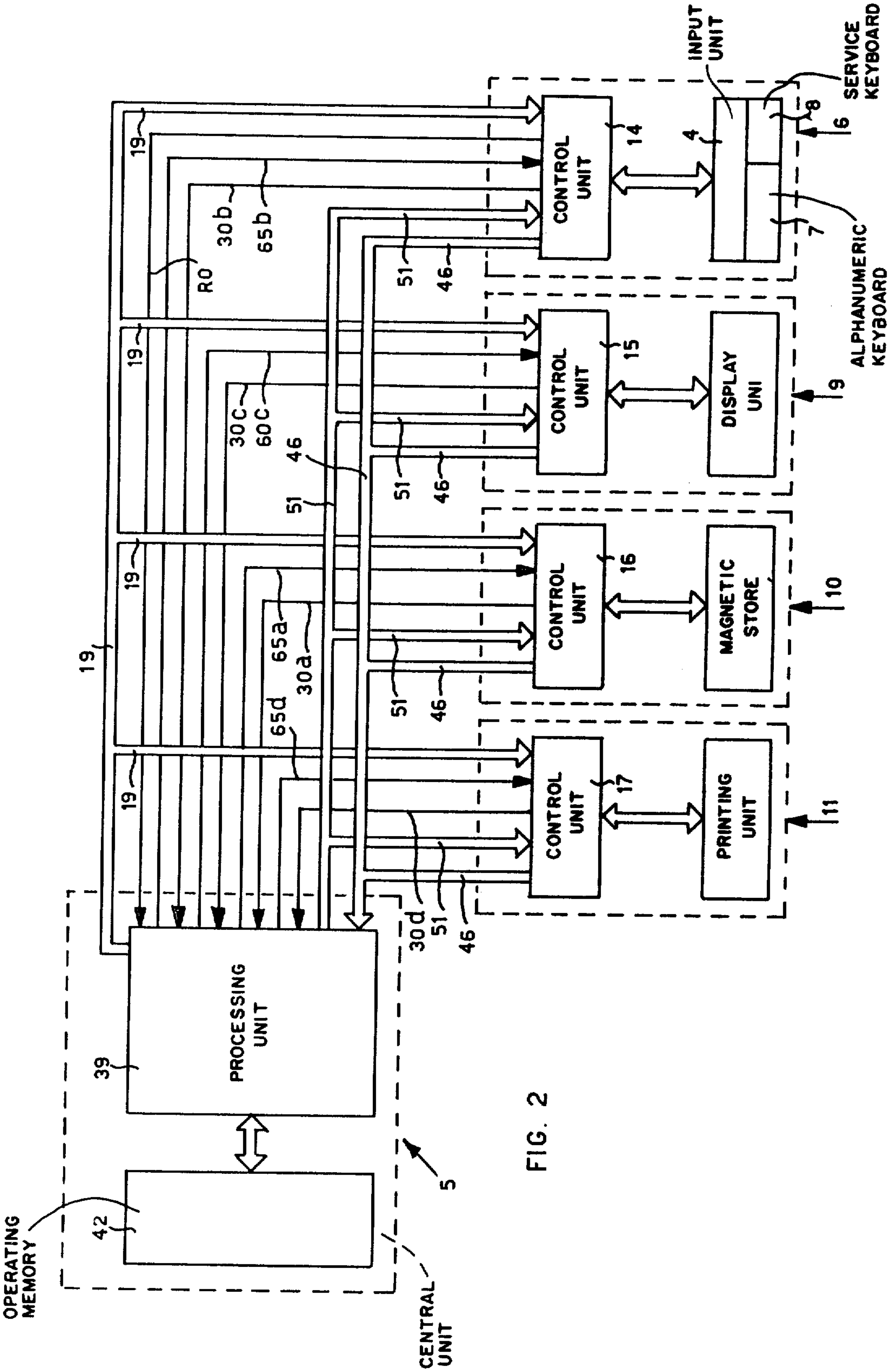
FIG. 2 is a block diagram of the system of FIG. 1.

The automatic writing system, according to the invention comprises a central unit 5(CU) (FIG. 2) having a processing unit 39 and a MOS operating memory 42. The central unit 5 is connected to a group of peripheral units including an input unit 6 having an alphanumeric keyboard for text entry 7 and a service keyboard 8 as well as display unit 9, a magnetic store 10 and a printing unit 11.

Each of the peripheral units 6, 9, 10, 11 is connected to the central unit by means of its own control unit 14, 15, 16, 17, 18 respectively, each of which is able to code and transmit the relevant commands and data coming from the central unit 5 to the peripheral unit and vice-versa.

Each of the control units 14-18 is connected to the central unit 5 through a data entry channel 46 and a data, or command, reception channel 51. Each control unit 14-18 is capable of receiving a selection input signal on wires 65a, 65b, 65c and 65d.

Each control unit 14-18 can also send an interrupt signal to the central unit 5 on wires 30a, 30b, 30c and 30d.

Each control unit 14-18 receives timing signals on channel 19 which synchronize the operation of each control unit with those of the central unit.

The keyboard 4 can send a reset signal on wire RO when one key of the service keyboard 8 is activated.

Each control unit will be hereinafter described in detail.

The input unit 6 comprises a keyboard encoder which codes the character activated and sends it to the control unit 14 for successive transmission to the central unit 5.

By means of the input unit 6 and its control unit 14 it is possible to either process text and transfer it to the memory 42 of the central unit 5 through the alphanumeric keyboard 7 or select the processing to be done through the service keyboard 8.

The magnetic memory 10 can be of the magnetic tape type as described in U.S. Pat. No. 3,940,746, in the name of the Applicant, or alternatively it can be of the floppy disk type. In the following, the magnetic memory 10 will be considered to be of the type described within the above mentioned patent.

The magnetic memory 10 can store all the command instructions for the writing system which are selected from time to time and transfered to the operating memory 12 of the central unit 5. Besides, it can store the magnetic recording of the text information entered through the input unit 6. The operator will be able to recall this text information in the central unit 5 so that they will be printed by the printer 11.

The printer 11 is a fixed carriage type with a moveable writing head. The writing head is preferably of the daisy wheel type.

The text to be processed is first key entered via the alphanumeric keyboard 7 and, according to the invention, displayed in successive positions of a line by means of the display unit 9, allowing therefore the operator to correct errors. At the end of the entering of each line, the central unit 5 commands the printing of the keyed and displayed line by the printer 11 Successively, the line of the text is recorded in the magnetic memory 10 through the control unit 17. Then, the operator can modify this text either by adding, cancelling or suppressing lines or paragraphes as well as modifying the length of the lines.

The structural construction of the writing system, according to the invention, is shown in FIG. 1; it comprises the alphanumeric keyboard 7, the service keyboard 8, the line display 9, the printer 11 and the tape magnetic memory unit 10.

CENTRAL UNIT

The central unit 5 is of the type described in U.S. Pat. No. 3,940,746 in the name of the Applicant. Reference can be made to the above mentioned patent for the detail of the logic circuits constituting the central unit.

The central unit 5 includes a timing unit 20 (FIG. 3) fed by the oscillator 21 for generating the timing signals TS, TM, TN, TR and TI with a period of about 2 μ necessary for the data flow within the central unit 5 itself.

The central unit 5 moreover comprises a register 30 (FIG. 3) with a capacity of 4 bits and composed of 4 flip-flop devices. The register 30 receives its input signals on wires 30a, 30b, 30c and 30d respectively connected to the peripheral control units 16, 14, 15 and 17 (FIG. 1). The outputs 31a, 31b, 31c and 31d (FIG. 3) of the register 30 are connected to the input of the memory logic circuit 31 which can force into a register 32, with a capacity of ten bits, a ten bit code indicating the peripheral unit that, in accordance with the interruption request on wires 30*a*, 30*b*, 30*c* and 30*d*, must be served before hand as already described in U.S. Pat. No. 3,940,746.

The logic circuit 31 is active, that is, it forces a ten bit code into the register 32, only when the flip-flop PR is set, that is, if its output Q=1. The flip-flop PR protects central unit 5 against the interruptions from peripheral units.

The flip-flop *INTEO* is set by the interruption request coming from one of the four wires 30*a*–30*d* only if the output Q of the flip-flop PR is=0 and Q=1.

The output of the register 32 is connected through a channel 33 to a reset logic circuit 34 with four outputs: 34*a*, 34*b*, 34*c* and 34*d*. Each of the four outputs is associated with a particular combination of ten bits of the register 32 and can actuate the outputs 31*a*–31*d* corresponding to the combination of ten bits present on the channel 33 for resetting the corresponding flip-flop of the register 30.

The output of the register 32 is connected through a channel 40 to another ten bit input register 41 of the memory MOS 42, and through a channel 43, to a counting network 44, of known type, which is able to increment by one unit the character introduced into it through the channel 43 and to store the character newly incremented in the register 32 to which the output of the counting network 44 is connected.

The bits contained in the input register 41 are also transferred to an address decoding network 45 of the store 42. On the basis of the configuration of the ten bit address present in the register 41, the decoding network 45 can select the cell of the store 42 corresponding to the address.

The outputs of the register 32 are directly connected as inputs to the decoding network 45 by means of the channel 40*a*. The MOS memory 42 has a capacity of 4×1024 characters of ten bits and is divided in four zones, called pages, each with a capacity of 1024 characters. Each page is identified by a code number 0,1,2 and 3 respectively. To identify a cell of the store 42, twelve bits are necessary, that is; two for identifying the page and ten for identifying a cell within the identified page.

The ten bit channel 46 common to the peripherals 6, 9, 10 and 11 (FIG. 1) is connected to an input memory logic circuit 47 (FIG. 3), the outputs of which are connected to the input of memory 42 through the ten bit channel 48.

The data stored in a selected cell of store 42 is read through the ten bit output channel 49 into an output register 50.

The register 50 is moreover connected, through a common channel 51, to the control units of the peripheral units (FIG. 1) for transmitting to them the data read from the store 42. The register 50 is moreover connected through a channel 55 to the register 41 (FIG. 3) to force into the same the next store address. The register 50 is moreover connected, through a channel 56 to a ten bit register 57, to force into the same the data which is to be temporarily stored. Moreover the register 50 is connected through a channel 58 to another ten bit register 59 to force into the same the codes of the instructions and it is also connected through the channel 58*a* to register 32. The data which is to be temporarily stored in the register 57 may come, apart from the register 50, from the register 32. To this end, the output of the register 32 is connected through a channel 66 to the input of the register 57.

Finally, in order to rewrite the data in the store 42, the output of the register 50 is connected in input through the channel 80 to the input of the logic circuit 47.

The register 59 is connected through an output channel 60 to a decoding network 62 which has fifteen outputs $62_1$ to $62_{15}$, each one associated with an instruction used by the central unit 5. The decoding network 62 is a combination network of the type described in U.S. Pat. No. 3,940,746.

Each instruction is identified by a ten bit code.

The first four bits of the instruction code distinguish an instruction from the the remaining six bits constitute the so-called "address modifier" as described hereinafter.

The network 62 activates one of the fifteen output conductors corresponding to the instruction identified by the four bits code present on channel 60. The outputs $62_1$ to $62_{15}$ of the decoding network 62 control a command logic 63 described in U.S. Pat. No. 3,940,746, which supplies a series of commands indicated hereinafter by the symbols COMO1 . . . COM50, which control the transfer of the data within the central unit 5, actuating the gate circuits indicated in FIG. 3 by a circle, thereby permitting the transfer of information along the transmission channels gated by these gate circuits from one register to another or from the store 42 (FIG. 2) to one of the registers 50, 57, 59, 32.

The register 59 is divided into three parts 59*a*, 59*b* and 59*c*, formed by four, three and two flip-flops respectively. The part 59*a* stores the first four bits of the code of the instructions which define the type of instruction. The outputs of the part 59*a* are connected to the channel 60 the channel 60. In second part 59*b* stores the first three bits of the mofifier. The outputs of the second part are connected to the channel 61*a*. The third part 59*c* stores second three bits of the mofifier, the output of this part is connected to the channel 61*b*.

The outputs of the parts 59*b* and 59*c* of register 59 are also connected to the channel 64 and are used by a decoding network 65 of the same type as the network 62, which select the peripheral unit on the basis of the content of the modifier, activating one of its four outputs 65*a*, 65*b*, 65*c*, and 65*d* connecting the register 50 to the selected peripheral unit through the channel 51.

The first two bits of the modifier 59*b* or 59*c* are sent through the OR gate 122 and a channel 70 to a register 71, with a capacity of two bits, which stores the address of the page of the store 42. The contents of the register 71 and the register 41 form a complete address for the store 42 which, as already seen, is formed by twelve bits which define one of the 1024 cells of the store 42.

The number of the store page contained in the parts 59*b* or 59*c* of the modifier can also be directly introduced in the decoding logic network 45 through the channels **72*a*, 72*b* and 110 and 123. The command logic unit 63 can also be conditionned by the bits of the modifier stored in the register 59 and transmitted to it by means of a channel 75. A conductor 76 moreover connects the output Q of the flip-flop INTEO to the command logic unit 63. In this way, each time a peripheral unit 6, 7 and 8 causes an interruption activating one of the flip-flops of the register 30, the logic circuit 31 transmits a signal on the conductor 76. This signal is then used by the command logic 63 for generating the commands relative to the interruption itself. The operative condition in which the central unit 5 carries out an instruction is named the "machine state". Each machine state has the duration of 2 μS and is defined by the time signal TS as shown in FIG. 4. In each machine state, a series of commands is generated by the command logic unit 63 (FIG. 2) as a function of the signals present at its input which, as has been said, represent individual instructions. More precisely, the instruction in course of execution are executed by the central unit 5 by means of the succession of a plurality of machine states. In each state, the operations to be carried out by the central unit 5 are defined. To this end, the command logic unit 63 comprises two blocks 63*a* and 63*b***.

The block **63*a* determines the sequence of machine states through which the selected instruction is to be carried out on the basis of the input signals transmitted by the function decoding network 62. The block 63*b*** generates a sequence of operative commands COM01-COM50 relating to the selected instruction.

The blocks **63*a* and 63*b*** are of the type shown in U.S. Pat. No. 3,940,746 and will not be described in detail.

The commands COM01-COM50 are sychronized with the signals TR-TI TM.

Figure 5:
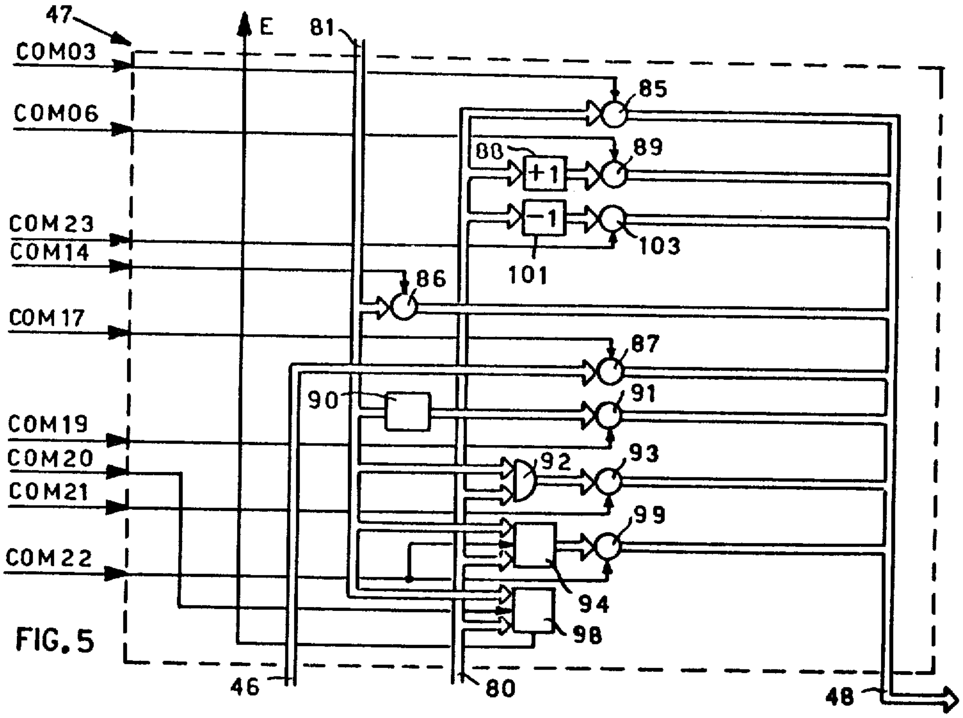
FIG. 5 is a logic block diagram of the memory input network of the central unit of FIG. 3.

The commands COM01-COM50 moreover act on the input logic circuit 47 (FIG. 5). This logic circuit 47 has, in addition to the input channel 46, two ten bit input channels 80 and 81 coming from the registers 50 and 57.

The logic circuit 47 simply transfers the data present on channels 80, 81 and 46 on the output channel 48, when it is acted by one of the commands COM03, COM14 and COM17 respectively through the AND circuits 85, 86, 87.

When the command COM06 or COM23 acts on the logic circuit 47, the character present on the input channel 80 is incremented or respectively decremented by one unit by counting network 88 (FIG. 5) and is therefore transferred through gate circuit 89 or 103 on the output channel 48.

When the command COM19 is generated, the first four bits of the channel 81 are interchanged with and the second four bits and the result is transferred on channel 48 through the exchange network 90 and the AND circuit 91. If the command COM20 is present, a comparator circuit 98 having inputs connected the two channels 80 and 81 (FIG. 5) is actuated.

The result of such comparison is represented by a bit E which is stored through the wire 95 in the flip-flop 96 the output Q of which is equal to 1 if the characters present in the two registers 50 and 57 are equal.

The content of the flip-flop 96 (FIG. 3) can be forced into another flip-flop 97 when the command COM26 is generated. The command COM13 determines the reverse transfer. Moreover, the bit E, through the conductor 100, conditions the operation of the command logic unit 63.

Besides, if the command COM21 or COM22 (FIG. 5) is present, an AND circuit 92 or respectively the exclusive OR circuit 94 transfers the ten bits present on the input channels 80 and 81 through a gate circuit 93 or 99 to the channel 48.

Figure 3:
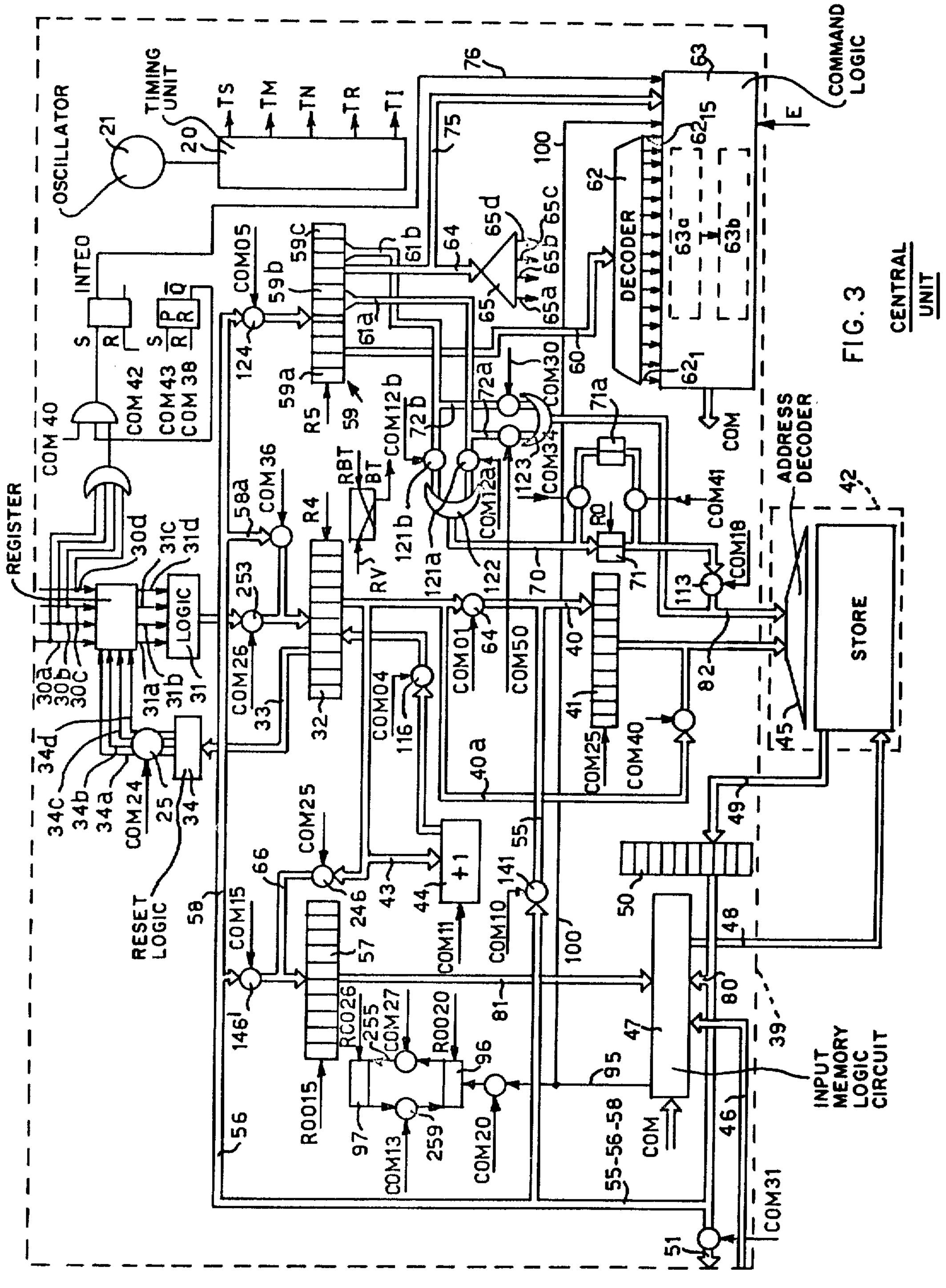
FIG. 3 is a logical diagram of the central unit of the system of FIG. 1.

The content of the register 71 (FIG. 3) (the page number of store 42) is temporarily stored in the register **71*a* through the command COM41 and then is transferred again to the register 71 through the command COM34 (FIG. 3**).

ORGANIZATION OF THE MEMORY 42

As mentioned above, the memory 42 is subdivided into four pages of 1024 characters of ten bits each. In the instructions there are ten bit addresses for direct addressing of a page. For each address there are moreover two bits which specify the page number. The four pages are indicated with the numbers from 0 to 3. Each of them can become the current page, that is, the page in which instructions are executed.

The current page is defined by the jump instruction and remains unchanged until it is redefined. In case of interruption, some zones of page 0 are used.

PROGRAMME ORGANIZATION AND INSTRUCTION LIST

The instructions which make up the program can be of 1, 2 or 3 characters of ten bits. They are read and successively executed (FIG. 6). The sequence can be altered only by a jump instruction or by an interruption caused by one of the peripheral units.

The bit numbering adopted is from left to right, from 0 to 9, corresponding the weight they assume in the counting operations.

INSTRUCTIONS WITH TWO ADDRESSES

They have the following format:

1° character, bit 0–3: function code; bit 4–9: modifier.
2° character, bit 0–9: 1° address of the memory 42
3° character, bit 0–9: 2° address of the memory 42

The table of the function codes is reported.

The operations which can be achieved with these types of instructions are the following:

(1) TRA: transfer the content of the character addressed from 1° to 2° address;

(2) SCA: transfer the content of the character addressed from 1° to 2° address after having exchanged the first five bits of the character with the second five;

(3) CFR: compare bit by bit the characters stored at the addresses indicated. Set the jump condition "E" to 1 if they are equal, to "O" if they are different. The condition remains available for all the successive jump instructions and can be modified by a successive comparison in case of interruption or by instructions to the peripherals;

(4) AND: carries out the logic product bit by bit of the characters stored at the addresses indicated and stores the result to the second address;

(5) ORE: carries out the exclusive "OR" bit by bit of the characters stored at the address indicated and stores the result in the second address.

The modifier bits (4–9) have the following meaning:
bit 4–5 page relating to 1° address;
bit 6 if equal "O" the first address remain unchanged, if equal to "1" it is incremented by 1 (module 1024) after complete execution of the instruction itself;
bit 7 - 8 - 9 as the preceding but referred to 2° address.

INSTRUCTIONS ON CONSTANTS

Have the following format:
1° character, bit 0–3: function code; bit 4–9: modifier;
2° character, bit 0—0: first operand (constant);
3° character, bit 0–9: address of the second operand.

The modifier bits (4–9) have the following meaning:
bit 4–5 always "0";
bit 6 increment (or not) of the constant according to the rules mentioned above;
bit 7–8 page relative to second operand;
bit 9 increment (or not) of the constant according to the rules mentioned above;

(6) TRC Transfer the constant to the address of the second operand.

(7) COC Compare the constant with the 2° operand and set the jump condition "E" according to the rule specified by the instruction CFR.

ARITHMETIC INSTRUCTIONS

These instructions are of two characters and have the following format;
1° character, bit 0–3, 9: function code; bit 4–8: modifier;
2° character, bit 0–9: address of the operand.

The modifier bits (4–8) have the following meaning:
bit 4–5 page of the address;
bit 6 increment (or not) of the address according to the rules mentioned above;
bit 7–8 always "0";
bit 9 1 ADD; 0 SUB.
ADD: increment of one unit the content indicated by the address with module 1024
SUB: decrement of one unit the content indicated by the address with module 1024.

JUMP INSTRUCTIONS

These instructions can be of one or two characters.

Let us first see the instructions of a single character which has the meaning of re-entry unconditioned jump; the address of the jump is the one which was stored in page "0" at the address "0" during the last, in chronological order, occurred interruption.

(10) JMP: re-entry unconditioned jump
bit 0–3: function code
bit 4–9: modifier

The modifier bits have the following meaning:
bit 4–9 (111001) maintains the protection on channels of low priority and suppresses the protection only on the memory unit 10. (101001) suppresses all protections.

The jump instructions with two characters are composed as follows:
1° character, bit 0–3: function code; bit 4–9: modifier;
2° character, bit 0–9: jump address

(11) SAL: Jump instruction

The modifier is composed as follows:
bit 4–5–6 001: unconditioned jump; 000: conditioned jump for ≠(condition "E"="0") 010: conditioned jump for equal (condition "E"="1");
bit 7–8: defines the new current page if the jump conditions are verified.

(12) SAR: unconditioned jump instruction with elimination of protection

The modifier has the following meaning:
bit 4–5 00: suppress the interruption protection on all channels; 01: maintains the interruption protection on three low priority channels; suppressing it only for the memory unit 10;
bit 6: always at "1";
bit 7–8: define the new current page;
bit 9: always at "0".

INSTRUCTIONS RELATING TO THE PERIPHERAL UNIT

(13) COP: Command to peripheral

This is an instruction with two characters composed as follows:
1° character, bit 0–3: function code; bit 4–9: modifier; 2° character, bit 0–9: is sent to the peripheral unit specified in the command and utilized according to its nature.

The modifier is composed as follow:
bit 4–7–8–9: always "0";
bit 5–6: peripheral unit to which the 2° character is addressed;
bit 5–6 00: magnetic memory unit 10; 10: display; 01: keyboard; 11: printer.

(14) CDP: Character from peripheral

Three character instruction composed as follow:
2° character, bit 0–9: constant to be compared with the address of the second operand. The jump condition "E" is set in conformity with the result of the comparison;
3° character, bit 0–9: address in which the character sent from the peripheral unit is transferred.

The modifier is composed as follows:
bit 4: always "0";
bit 5–6: define the peripheral unit;
bit 7–8: page of the address;
bit 9: increment (or not) of the address.

The comparison is made before the eventual increment of the address.

(15) CAP: Character to peripheral

This instruction is similar to the preceding instruction except that the transfer occurs from the peripheral to the memory.

TABLE OF FUNCTION CODES

| N. Instructions | Instruction Symbolic Code | Instruction Function Code bit 0 1 2 3 . . . 9 | |
|---|---|---|---|
| 1 | TRA | 1 1 0 1 | |
| 2 | SCA | 1 0 1 1 | |
| 3 | CFR | 1 0 0 1 | |
| 4 | AND | 1 0 1 0 | |
| 5 | ORE | 1 1 1 0 | |
| 6 | TRC | 0 1 0 0 | |
| 7 | COC | 0 0 0 0 | |
| 8 | ADD | 1 1 1 1 | 1 |
| 9 | SUB | 1 1 1 1 | 0 |
| 10 | JMP | 0 0 1 1 | 1 |

-continued

TABLE OF FUNCTION CODES

| N. Instructions | Instruction Symbolic Code | Instruction Function Code bit 0 1 2 3 . . . 9 |
|---|---|---|
| 11 | SAL | 0 0 1 1   0 |
| 12 | SAR | 0 1 1 1   0 |
| 13 | COP | 0 0 1 0 |
| 14 | CDP | 1 0 0 0 |
| 15 | CAP | 1 1 0 0 |

EXECUTION OF INSTRUCTIONS

As has been said, the block 63 A determines the succession of the machine states for the central unit in order to carry out a determined instruction. More precisely, the machine states of the central unit are six (A, B, C, D, E, F), each identified by the set of a corresponding flip-flop MA, MB, MC, MD, ME, MF contained in the block 63 A; as an example the condition MA=1 (flip-flop MA set) will indicate that the central unit is in the machine state A. The sequence of the states depends on the type of instruction which is being carried out.

The first state during the execution of any instruction or at the start of the machine is always the state A.

Figure 7:
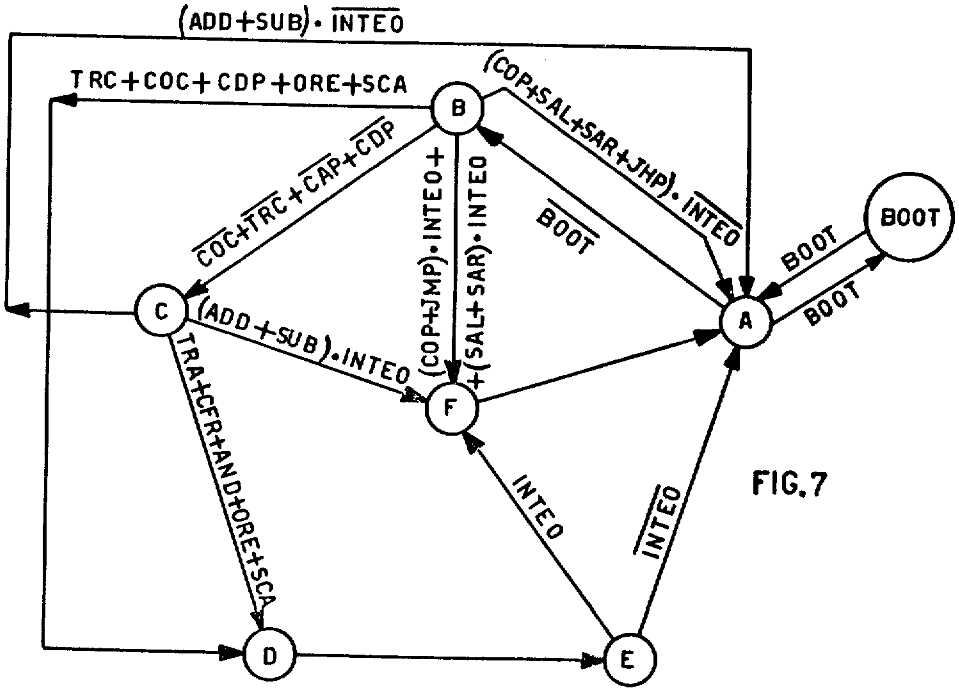
FIG. 7 is a logic diagram relating to the states sequence of the central unit of FIG. 3.

The succession of state is indicated in FIG. 7. From the state A it goes to state B if it is not loading the initial program (BOOTSTRAP BT=0); otherwise it passes to a machine state characteristic of the machine initializing (BOOTSTRAP BT=1) as described in the U.S. Pat. No. 3,940,746.

The passage from the state B to the state C is then effected for all instructions except for COC, TRC, CAP, CDP. The passage from the state B to the state F for the instructions COP, SAL, SAR, JMP is effected if the flip-flop INTEO has been set (pending interruption). There is a return from the state B to the state A for the instructions COP, SAL, SAR, JMP if the flip-flop INTEO has not been set.

There is a passage from the state B to the state D for the instructions TRC, COC, CDP, CAP, ORE and SCA.

The passage from the state C to the state A is made for the instructions ADD, SUB if the flip-flop INTEO has not been set, while it goes from the state C to the state F for the same instructions if the flip-flop INTEO has been set.

There is a passage from the state C to the state B for the instructions TRA, CFR, AND, ORE and SCA. From the state D there is always a passage to the state E. From the state E there is a passage to the state F if the flip-flop INTEO has been set, otherwise there is a passage to the state A. The passage to the state F is always made to the state A.

In the following tables are reported: the commands generated in the various states, the timing with which these commands are generated with reference to the timing diagram of FIG. 4, the conditions in which they are generated and the operations that they cause.

The following are are behind sufficient to explain the functioning of the central unit in diverse states for the execution of any instructions.

The following conventions are of use for reading the tables:

| | |
|---|---|
| (Rxx) | indicates the content of the register identified in the drawings as xx; |
| (Rxx)→Ryy | indicates the transfer of the content of the register xx into the register yy; |
| (Rxx) ⤨ Ryy | indicates the transfer of the content of the register xx into the register yy after having exchanged the first 5 bits with the second 5; |
| (Czz) | indicates the content of the channel zz. |

STATE "A"

| COMMAND | OPERATION | CONDITIONS | TIMING |
|---|---|---|---|
| COM01 | (R32)→R41 | | TS |
| COM18 | (R71)→C82 | | TS |
| | (C49)→R50 | | MA |
| COM03 | (R50)→C48 | BT = 0 | TM |
| COM17 | (C46)→C48 | BT = 1 | TM |
| COM05 | (R50)→R59 | | TS |
| COM04 | (R44)→R32 | | TR |
| RBT | Reset BT | BT = 0 | TR |

STATE "B"
MB = 1

| COMMAND | OPERATION | CONDITIONS | TIMING |
|---|---|---|---|
| COM01 | (R32)→R41 | $\overline{JMP}$ | TS |
| COM18 | (R71)→C82 | $\overline{JMP}$ | TS |
| COM25 | "0"→R41 | JMP | TS |

-continued

| | | | |
|---|---|---|---|
| RO COM18 | "0"→C82 | JMP | TS |
| | (C49)→R50 | | MB |
| COM06 | (C80)→C48 | b5 . $\overline{COP}$ . $\overline{SAL}$ . $\overline{CAP}$ . $\overline{CDP}$ | TM |
| COM15 | (R50)→R57 | | TR |
| COM04 | (R44)→R32 | Jump conditions not verified | TR |
| COM36 | (R50)→R32 | Jump conditions verified | TR |
| COM31 | (R50)→C51 | COP | TR |
| COM26 | (R96)→R97 | SAR + JMP | TM |
| COM12b | (R59c)→R71 | Jump conditions verified . JMP | TR |
| COM34 | (R71a)→R71 | JMP | TR |
| COM38 | Reset PR | SAR + JMP | TI |
| COM40 | Set INTEO | PR . IN | TS |

STATE "C"
MC = 1

| COMMAND | OPERATION | CONDITIONS | TIMING |
|---|---|---|---|
| COM10 | (R50)→R41 | | TS |
| COM50 | (R59b)→C82 | | TS |
| | (C49)→R50 | | MC |
| COM15 | (R50)→R54 | | TR |
| COM6 | (C80) + 1→C48 | ADD | TR |
| COM28 | (C80) − 1→C48 | SUB | TR |

STATE "D"
MD = 1

| COMMAND | OPERATION | CONDITIONS | TIMING |
|---|---|---|---|
| COM01 | (R32)→R41 | | TS |
| COM18 | (R71)→C82 | | TS |
| | (C49)→R50 | | MD |
| COM06 | (C80) + 1→C48 | RUB 20 | TM |
| COM04 | (C44)→R32 | | TR |
| COM20 | (C95)→R0020 | CDP + CAP | TR |

STATE "E"
ME = 1

| COMMAND | OPERATION | CONDITIONS | TIMING |
|---|---|---|---|
| COM01 | (R32)→R41 | | TS |
| COM30 | (R59c)→C82 | | ME |
| | (C49)→R50 | | TM |
| COM06 | (C80)→C48 | CAP + COC + CFR | TM |
| COM14 | (R57)→C48 | TRC + TRA | TM |
| COM19 | (R57) ⇄ C48 | SCA | TM |
| COM21 | (R57) . (R50)→C48 | AND | TM |
| COM22 | (R57) + (R50)→C48 | ORE | TM |
| COM20 | (C95)→R96 | COC + CFR | TM |

-continued

| | | | |
|---|---|---|---|
| COM17 | (C80) − 1 ⟶ C48 | CDP | TM |
| COM31 | R50 ⟶ UP | CAP | TM |

STATE "F"
MF = 1

| COMMAND | OPERATION | CONDITIONS | TIMING |
|---|---|---|---|
| COM25 | "0" ⟶ R41 | | TS |
| RO | "0" ⟶ R71 | | TS |
| | (C49) ⟶ R50 | | MF |
| COM40 | (R32) ⟶ C43 | | TM |
| COM26 | (31) ⟶ R32 | | TR |
| COM24 | Reset 30 | | T1 |
| COM43 | Set PR | | T1 |
| COM42 | Reset INTEO | | T1 |
| COM41 | (R71) ⟶ R71a | | T1 |
| COM27 | (R0020) ⟶ R0026 | | T1 |

INTERRUPT CONTROL

During the execution of one of the above instructions, an interrupt request may reach the central unit 5 (FIG. 2) from any one of the peripheral units connected to it. At the end of the execution of the pending instruction, in course of execution, the execution of the program in process is interrupted and another series of instructions is carried out.

The machine state during which the branch is made from the program being executed to the program servicing the interrupt is the state F. This state is branched to during the execution of an instruction if the flip-flop which defines the presence of an interruption request has been set.

In the state F:

the cell 0 of page 0 of the memory is addressed ("0" is forced in R41 and in R71);

in this cell, the address of the next instruction to be executed for the interrupted program is transferred ((R32)→C43);

R32 the character stored in R31 is transferred to defining the peripheral unit which has requested the interruption and which has been chosen to be served; the code represents the address of the cell of page 0 of the programme able to service the interruption requested by the peripheral unit; which has requested this same interruption.

the flip-flop PB is set which identifies the protection state by another interruption request;

in R71*a*, the page number is stored in which the last instruction executed was stored;

the branch condition is stored in EM.

After this, the central unit passes to the state A and in this way the central unit starts the execution of the first instruction of the interrupt program for the selected peripheral unit.

The interrupt program of any peripheral unit ends with the single character instruction JMP which, as has been seen, executes a re-entry unconditioned jump to the address stored at the address of page 0. This address corresponds to the address of the instruction of the program dropped at the arrival of the interruption.

KEYBOARD

The keyboard is composed of two distinct parts 7 and 8.

The first part 7 corresponds essentially to the alphanumeric keyboard of a normal typewriting machine, containing all those keys able to generate a code of alphanumeric characters and a code of commands relative to the editing of the text being processed.

The following keys further belong to the first part 7:

RC=carriage return key with line feed;

SOT=automatic underlining set key

This key can assume one of the two stable positions (SOT=1, SOT=0). In one position (SOT=0) this key is inactive while in the other position (SOT=1) it causes the underlining of each alphanumeric character typed;

MA=shift forward key with confirmation

Each key stroke of this key causes the shift left of one place of portion of the line visible on the display 9 and the confirmation of the character displayed in the right most cell of the display as it will be better described hereinafter;

BK=back-space key

Each keystroke of BK causes the shift right of one place of the portion of line displayed as will be better described hereinafter;

CL=cancel key

Causes the cancel of the character displayed in the right most cell of the display and the shift towards the left of one place of all characters of the line following the cancelled one;

RP=preceding line key

This is a bistable key. In one of its two stable positions (set RP), it is active and causes the visualization on the display of a portion of the line stored in the system and which line preceeds preceding the line in course of entry. When this key is active, only the keys MA and BK are enabled by the central unit; in the other stable position (reset RP), the key RP is inactivated.

The second part 8 of the keyboard comprises the keys S, R, M and P called reset keys. These keys provide codes defining a particular operating mode for the system. As a result, the central unit can abandon, the programme being executed and load a new program from the memory unit 10 to control the system.

In this way, the key S identifies the service mode; the key R identifies the text recording mode; the key M identifies the text modification state; the key P identifies the printer mode for text already recorded.

KEYBOARD CONTROL UNIT

Figure 8:
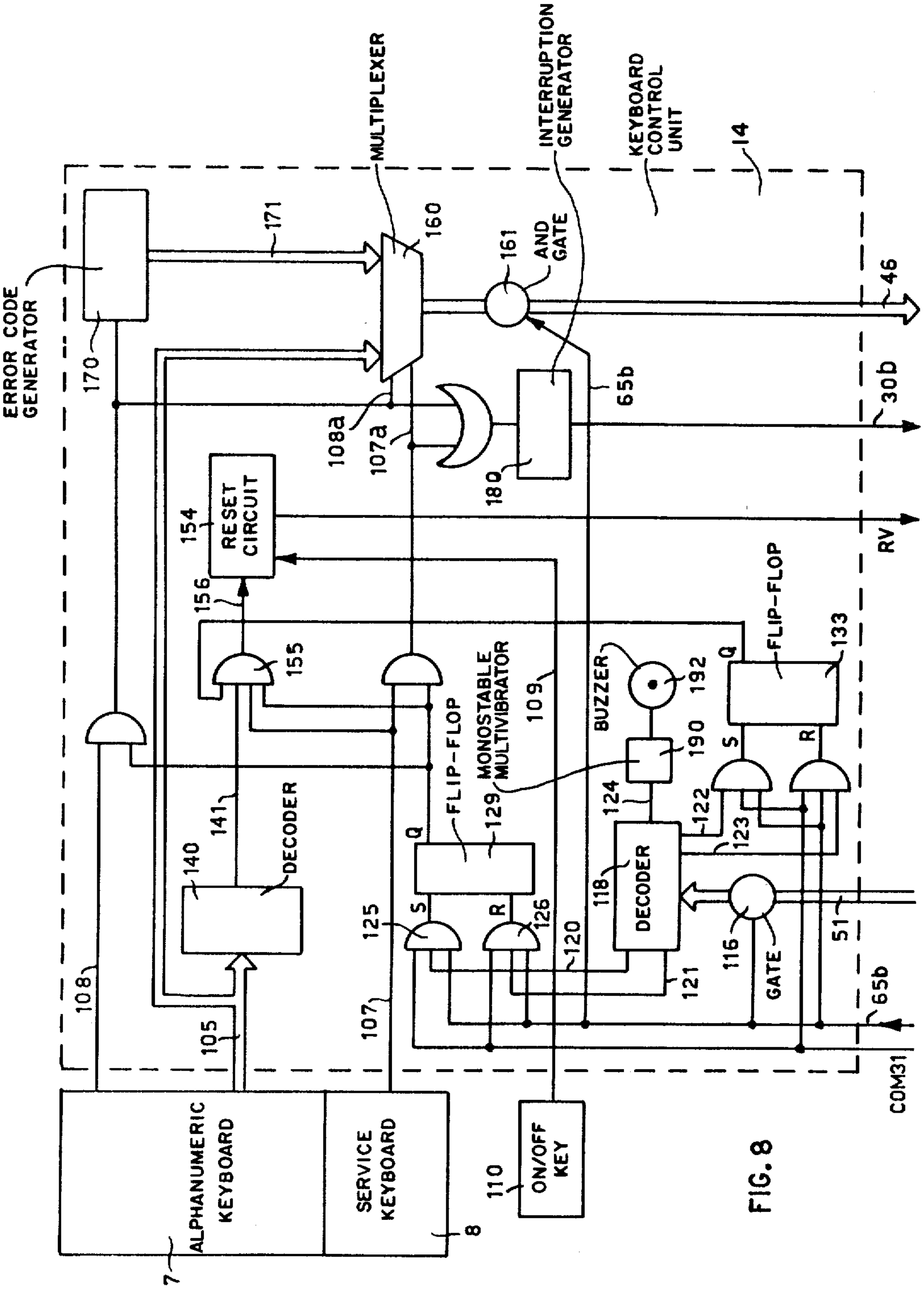
FIG. 8 is a logic block diagram of the keyboard control unit.

The two parts 7 and 8 of the keyboard 6 are controlled by a unique control unit 14, the block diagram of which is represented in FIG. 8.

With reference to this figure, the keyboard control unit 14 has the following inputs coming from the keyboard 6:

(a) The channel of 10 bits 105 which furnishes a code corresponding to the key actuated;
(b) A wire 107 which furnishes a digital signal at logical 1 level each time a key is actuated;
(c) A wire 108 which furnishes a digital signal at logical 1 level each time there is a contemporaneous actuation of two or more keys;
(d) A wire 109 which furnishes a digital signal at logical 1 level when the machine is set "on" by means of the on/off switch 110.

Moreover, the keyboard control unit 14 has the following inputs from the central unit 5:

The 10 bit channel 51 on which are sent the character codes from the C.U. to the peripheral units by means of the instructions CAP or COP,
The wire 65*d* which furnishes a digital signal at logical 1 level each time the keyboard is selected;
The command COM31 on channel 19.
The commands which can be sent to the control unit 14 on channel 51 are listed in the following table:

| COMMANDS | CODE bit 0 . . . 9 |
|---|---|
| (1) ENABLE KEYBOARD CONTROL UNIT | XXXXXXXXX0 |
| (2) DISABLE KEYBOARD CONTROL UNIT | XXXXXXXXX1 |
| (3) ENABLE KEYS S,R,M,P | XXXXXX0XX0 |
| (4) DISABLE KEYS S,R,M,P | XXXXXX1XX0 |
| (5) ACTIVE BUZZER | XXXXXXXX10 |

X means that the value of the bit is not significant and can be indifferently 0 or 1.

The channel 51 is connected to the decoder 118 through the gates 116 in response to the selection wire 65*d*. The decoder 118 has five outputs 120, 121, 122, 123 and 124 which are at logic level 1 only when the input commands are respectively "ENABLE KEYBOARD CONTROL UNIT", "DISABLE KEYBOARD CONTROL UNIT", "ENABLE KEYS S,R,M,P", "DISABLE KEYS S,R,M,P" and "ACTIVE BUZZER".

The output 124 is connected to a monostable multivibrator 190 which controls a buzzer 192. The monostable multivibrator 190 is actuated by the logic level 1 of the decoder output 124 and causes the buzzer 192 to ring for a prefixed period of time so informing the operator that a procedure error has been made in keying in data or commands.

The outputs 120 and 121 are connected through AND gates 125 and 126 to the set and reset inputs of the flip-flop 129.

Other inputs to the AND gates 125 and 116 there are the COM31 and the selection wire 65*d*. These AND gates enable the flip-flop 129 (Q=1) or disable the flip-flop (Q=0), in accordance with the condition of the keyboard control unit. Similarly, the flip-flop 133 receives its set and reset inputs the outputs 122 and, respectively, 123 of the decoder 118 and it stores the enable condition (Q=1) or disable condition (Q=0) of the reset keys.

The channel 105 is connected to the input of the decoder 140 which decodes the codes corresponding to the reset keys and as a result sets its output 141 to level 1.

The output 141 of the decoder 140 is connected to the input 156 of a reset circuit 154 through an AND gate 155 enabled by the keyboard strobe on wire 107 and by the output Q of the flip-flop 129 and 133.

The circuit 154 sends to the central unit 5 a reset signal on wire RV anytime it receives a logic level 1 on input 156.

The circuit 154 may also be actuated by the input 158 set at level 1 by switching on the on/off key 110.

The reset signals RO,COM25 and RV, sent to the central unit 5, cause the abandonment of the program in course of execution, the execution of the loading program (Boot-strap BT=1) and the loading in the memory 42 of the program which controls the operating made selected by the reset keys.

The first instruction of the loading program is a CDP from the keyboard which permits the loading program to recognize which reset key has been actuated and, as a result, which program must be loaded into the operative memory. The loading program is similar to the one described in the U.S. Pat. No. 3,940,746.

The channel 105 is output from the control unit 134 towards the central unit 5 through the multiplexer 160 and the AND gates 161, actuated by the selection wire 65*d*. The inputs of the multiplexer 160 are connected to the output 171 of an error code generator 170 actuated by the signal of a double key stroke condition on the wire 108.

The multiplexer is controlled by signals on wires 107*a* and 108*a* in the following way:

if the signal on wire 107*a* is at 1 level, then the channel 105 is connected to the output channel 46.
if the signal on wire 108*a* is at 1 level then the channel 171 is connected to the output channel 46. The error code generator 170 forces on the output channel 46 a particular configuration of bits which signals the double keystroke condition to the central unit 5.

The key-stroke signal as well as the double key-stroke wires 107 and 108*a* actuate an interruption generator 180 which sends an interruption request signal to the central unit 5 through a wire 30*b*.

The C.U.5 will respond to the interruption request signal with a CDP instruction from the keyboard by means of which the content of the channel 46 will be stored in the operative memory 42.

DISPLAY

The display 9 displays twenty one characters, each indentified according to a dot matrix of 12 lines and 5 columns of display points, each separated by a space character of one column.

The display 9 is of the self-scan plasma type which employs the charging of a gas (NEON) between two electrodes at high tension (250U) for illuminating each point.

Figure 9:
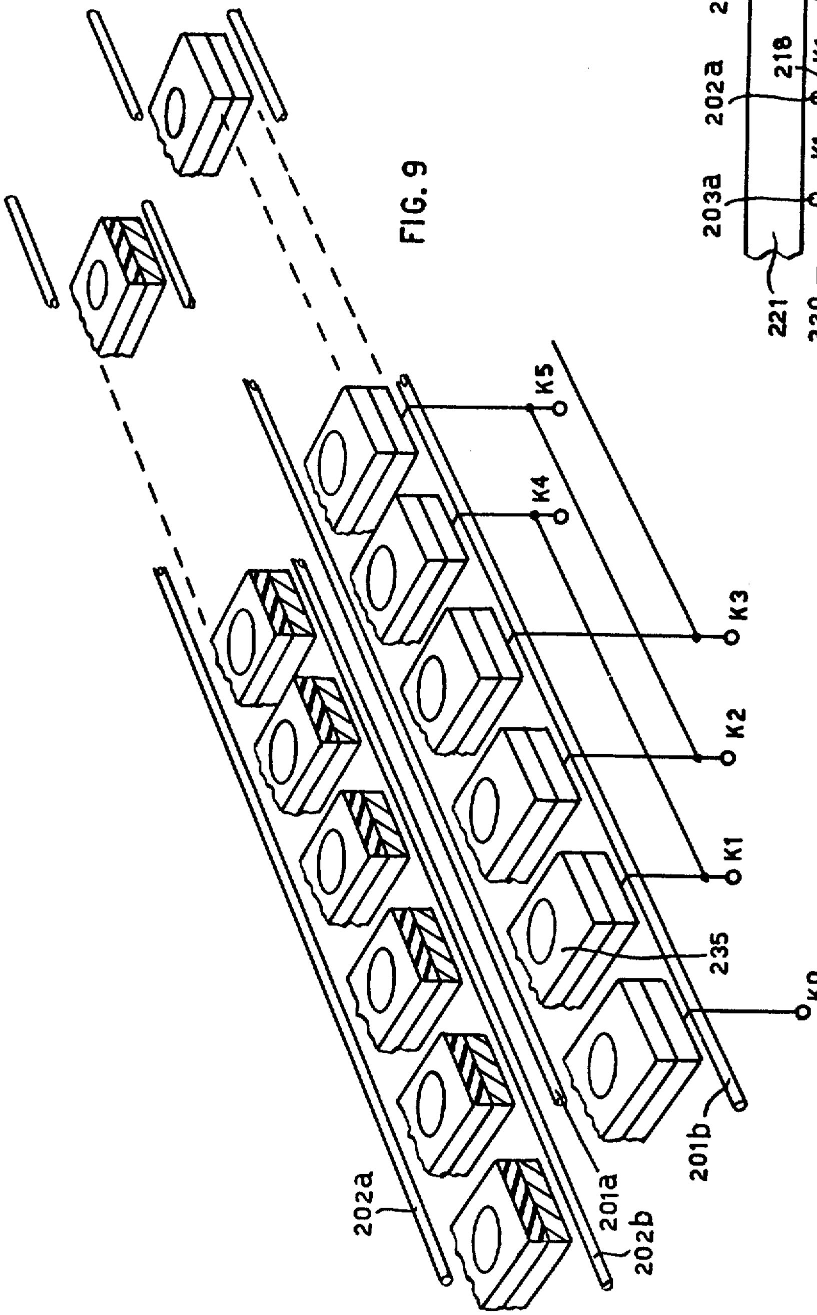
FIG. 9 is a partial prospective view of the display.
Figure 10:
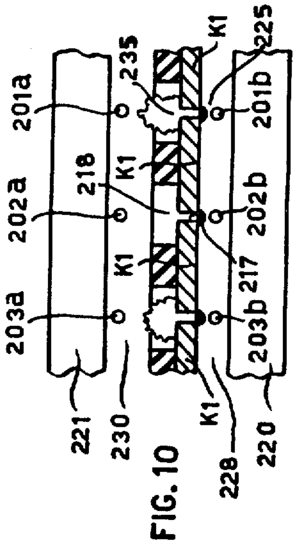
FIG. 10 is a partial, frontal, sectional view of the display.

The display 9 is constituted by a unique panel which has twelve pairs of anodes **201*a*,201*b*,202*a*,202*b* . . . 212*a*,212*b* and 127 cathodes Ko–K126 laid upon a reticle as diagrammed in the figures 9, 10 and 11**.

Each intersection zone of an anode pair, i.e. **202*a*** and *b* with a cathode, i.e. K1 filled with gas NEON, defines a display point which can be selectively illuminated (FIG. 9) by the application of a suitable difference of potential between the corresponding anode pair and the cathode (250V).

The display is "self-scanning", this characteristic is obtained by connecting the cathodes in the way indicated in FIGS. 9, 10 and 11. Precisely, the cathode K1 is connected with the cathodes K4, K7, K10 . . . K124. That is, all the cathodes are spaced 3xN from K1 with N entire and positive are connected to K1. Similarly the cathodes K5, K8, K11 . . . K125 are connected to K2 and the cathodes K6, K9 . . . K126 are connected to K3.

The cathode K0 is not connected to any other cathode and constitutes the reference cathode. The signals shown in FIG. 12 are sent to the four groups of cathodes K0, K1, K2 and K3.

Initially, at time TK0 the cathode K0 is grounded and a posterior glow-discharge is created in all the cells which cross the cathode K0.

Successively, at the time TK1-1 the cathode groups connected to cathode K1 are grounded. Since the cathode K1 is placed closer to cathode K0 than the cathodes K4, K7, K10, the glow-discharge passes preferentially to the cathode K1 rather than to the other cathodes K4, K7, . . . K10.

Successively, at time TK2-1 all the cathodes K5, K8 connected to the cathode K1 are grounded and the posterior glow-discharge transfers itself preferentially to the cathode K2 which is closed to K1. At time TK3-1, all the cathodes connected to K3 are grounded and the posterior glow-discharge passes to the cathode K3.

At time TK1-2, the group of cathodes connected to the cathode K1 are again energized and thus the posterior glow-discharge passes to the cathode K4 which is closest to the cathode K3, which was previously ionized, and so on until passage of the glow-discharge to the cathode K126, which occurs at time TK3-42.

Successively, at time TK0-2 the reference cathode K0 is grounded again. The charge is loaded off cathode K126 and put again on the cathode K0 and the sequence starts again. Exploiting the principle of the preferential transfer of the discharge from one cathode to the adjacent one, the cathode driving circuits are reduced to four rather than the 126 circuits which would be required for the column addresses if the display did not have the self-scanning characteristic. For the character display, twelve driving circuits for the lines (anodes) are necessary; they are activated in synchronism with the column addresses operated by the display control unit.

For operating purposes the 126 point columns of the display 9 are gathered in groups of five columns V1–V21 (FIG. 15) spaced by one column. Each group of 5 columns is employed to display one alphanumeric character and is called a "cell". The columns interposed between two adjacent groups are normally un-lit and serve for displaying the space between two characters.

DISPLAY CONTROL UNIT

Figure 13:
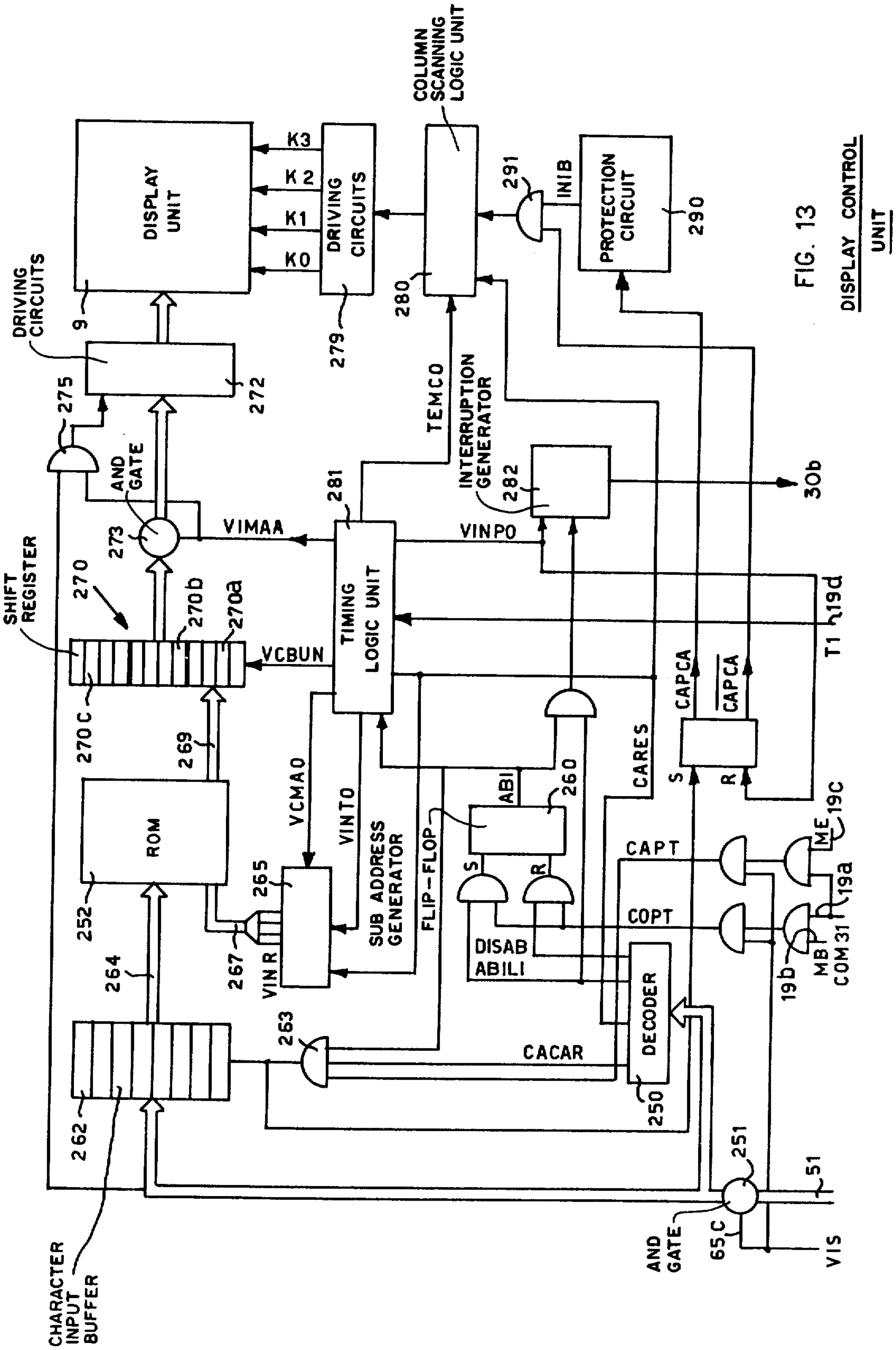
FIG. 13 is a block diagram of the display control unit.

The display control unit 15 is represented in FIG. 13. It receives the following inputs from the central unit:

the channel 51 of at ten bits;

the selection display signal VIS on wire **65*c*;**

the AND command COM31 on a first wire **19*a* of the channel 19 and the state signal MB which defines the signal COP COPT on another wire of the channel 19**;

the AND command COM31 and the state signal ME on wire **19*c* of the channel 19** which defines the signal of CAP CAPT;

the timing signal T1 on a fourth wire **19*d* of the channel 19**.

The channel 51 is connected through the AND gates 251 enabled by the selection signal VIS. The decoder 250 distinguishes between the input codes as the follows:

enabling COP character (0000000001);

CAP reset characters (XXXXXXXXX1);

CAP characters, code of the character that can be displayed (XXXXXXXXS0), where S=0 if the character is not underlined and S=1 if the character is underlined);

disabling COP character (0000000000) which sets at logic level 1 the outputs ABILI, CARES, CACAR and DISAB, respectively.

The logic level 1 ABILI sets the flip-flop 260 (ABI=1) with the timing signal COPT. The logic level signal DISAB resets the flip-flop 26 (ABI=0) with the timing signal COPT.

The channel 51 is also connected in, through the AND gate 51 to the 8 bit character input buffer 262. The loading of the first 8 bits of the channel 51 in buffer 262 occurs with the signal CAPT sent through the AND gate 263 by CACAR =1 and ABI=1. The output 264 of the buffer 262 is connected in input to a ROM (read only memory) 252 having an addressing parallelism 12 and an output parallelism 4.

The other four bits necessary to address the ROM 252 are furnished as input by a sub-address generator 265 through the channel 267.

The output channel 269 of 4 bits 269 of the ROM is connected in input to the first 4 bit stage **270*a* of a shift register 270 comprising three 4 bit stages 270*a*, 270*b*, 270*c*.**

For each shift signal (VCBUN) applied to the register 270 from the input 271, the information present in channel 259 is stored in the stage **270*a*; while the information previously stored in the stages 270*b* and 270*c* is transferred in the stages 270*b* and 270*c*** respectively.

The shift register 270 is connected through the AND gate 273, enabled by the signal VIMAA, to 12 driving circuits 272 for the 12 display anodes (each corresponding to a line of the matrix 12×5).

In particular, the bit 9 of the channel 51 is connected, through the AND gate 275 enabled by the signal VIMAA, directly to the driving circuit 272 of the anodes 212*a, b* corresponding to the last (12*a*) line of the matrix and defines whether the character should or should not be underlined.

The selection of the columns occurs by means of 4 column driving circuits 279 and the columns scanning logic unit 280 which scans according to what is above described with reference to FIG. 12.

The columns scanning logic unit 280 receives a timing signal TEMCO on which it is synchronized to furnish the scanning signals. A timing logic unit 281, synchronized on a signal T1 coming from C.U., furnishes the timing signals: VCBUN for the shift register 270, VIMAA for the enabling of the gates 273 and 275, TEMCO for the columns scanning logic unit 280.

The timing logic unit 281 also furnishes the following signals: VCMAO and VINTO to the generator of sub-addresses 265 and VINPO to the interruption generator 282.

Figure 14:
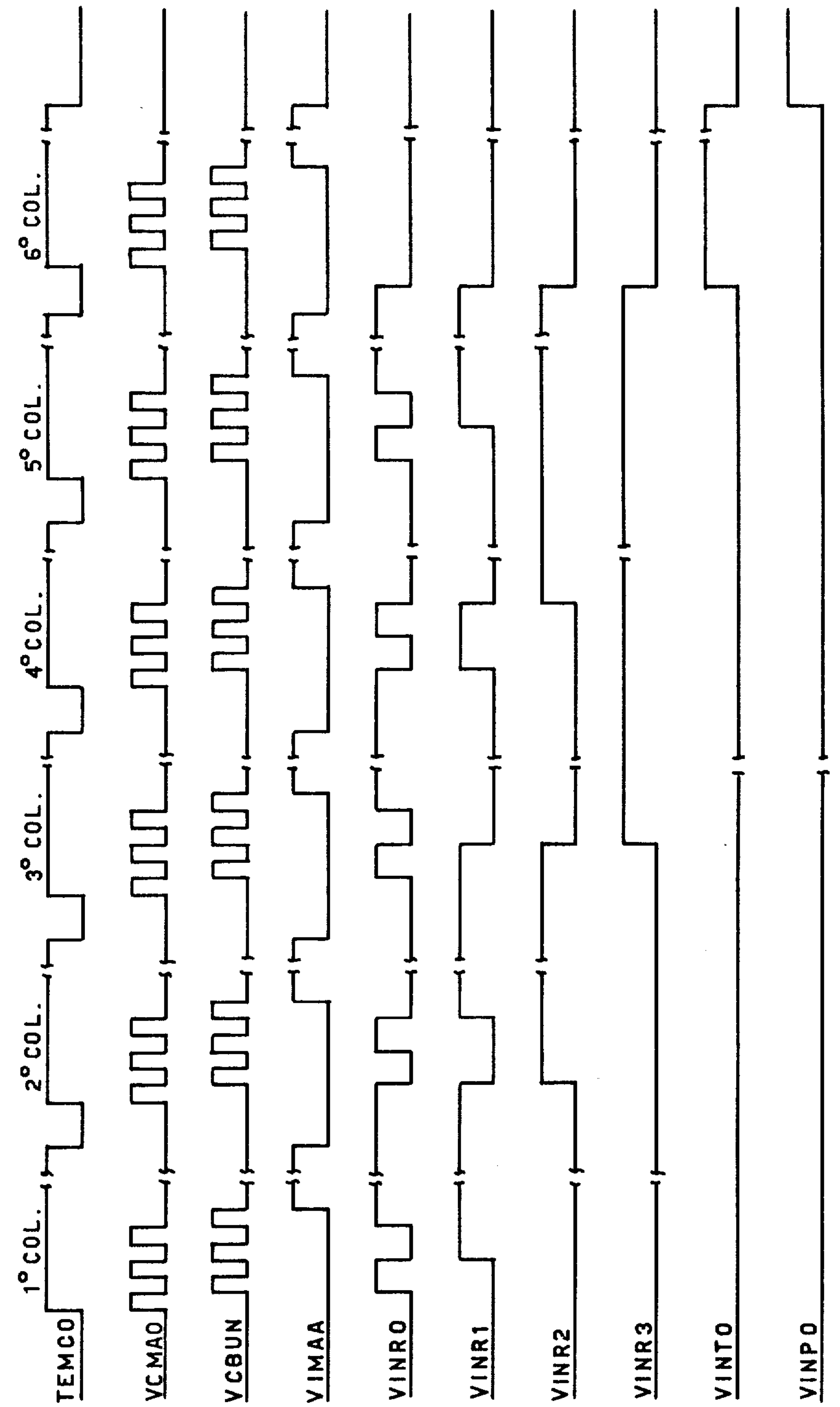
FIG. 14 is a diagram of the timing signals of the display control unit.

The time relationship between the various input and output signals of the timing unit 281 is represented in the FIG. 14.

The timing logic unit is enabled to emit output signals by the condition CAPCA=1.

The sub-address generator 265 is essentially composed of a 4 bit binary counter known in the art, the outputs of which VINR0, VINR1, VNR2 and VINR3 constitute a 4 bit channel 267 connected in to the ROM. The counter 265 is able to count the signals VCMA0 when it receves an input signal VINT0 which is at logic level 0.

FIG. 14 shows the time variation of the outputs VINR0-VINR3 and the input signals VINT0 and VMA0; the counter commutates on the down lead front of the input signals.

The display control unit 15 also comprises a protection circuit 290 which determines the extinction of the display 9 by inhibiting the columns scanning logic unit 280, when the time between a CAP of a character and its successor exceeds a predetermined value. This prevents the glow-discharge from stopping on a determined column, so to prevent destroying the electrodes. The protection circuit 290 is composed of a monostable multivibrator which generates when an impulse activated, the period of which constitutes the inhibition signal INIB for the logic unit 280.

The signal INIB is input to the logic unit 280 through the AND gate 291 enabled by the output CAPCA of the flip-flop CAPCA.

The protection circuit 290 is activated by the signal VINP0 which signals the end of the handling of a CAP. It becomes operative only if the flip-flop CAPCA has not been newly set (CAPCA=1) within the predetermined time.

The functioning of the display control unit is as follows: assuming the control unit 15 disabled (ABI=0).

To enable the control unit 15 the central unit 5 must send an enabling COP; the character of the COP is decoded by the decoder 250(ABILI=1) and causes the setting of the flip-flop 260 which, with its output ABI=1, enables the various units of which the control unit is composed.

The setting of the flip-flop 260 actuates the interruption generator 282 which sends an interruption signal to the central unit 5 on the wire 30*b*.

When the central unit responds to the interruption request it executes a CAP of reset display control unit (character CAP=XXXXXXXXX0) which is decoded by the decoder 250 (CARES=1) and causes the setting of flip-flop CAPCA (CAPCA=1) and the positionning by the scanning logic 280 of the glow-discharge on the reference cathode K0.

The setting of the flip-flop CAPCA actuates moreover the interruption generator 282 which sends a new interruption signal to the C.U. on wire 30*b*. When the central unit 5 responds to the new interruption request it executes a CAP character to the display control unit 15, sending the 10 bit code of the first character to be displayed on the channel 51.

When the CAP of characters if decoded by the decoder 250 (CACAR=1) the flip-flop CAPCA is with the loading of the first 8 bits of the character code in the buffer 262, the timing logic unit 281 is enabled, which starts the emission of signals according to the timing diagrammes of FIG. 14 in synchronism with the signals T1 furnished by the central unit 5. The signals generated have the following functions:

TEMCO causes, on each descent to logic level 0, the transfer of the discharge of a cathode to the adjacent one. In FIG. 14 six impulses have been drawn which in the following description are referred to as first six consecutive columns of the display necessary to display the character, the code of which is contained in the buffer 262;

VCMA0 sends three different sub-addresses to the ROM 252 during the selection of each column (TECNO=1);

VCBUN causes, on each ascent to logic level 1, shift signals for the shift register 270; whereby at the end of three ascents to 1 of signal VCBUN, stages 270*c*, 270*b* and 270*a* will stored the first, the second and respectively the third code of 4 output bits from the ROM in time order;

VIMAA ascends to logic level 1 at the end of the third impulse of shift VCBUN during the selection of each column and descends to logic level 0 with the descent to 0 of the signal TENCO; the period at logic level 1 establishes therefore the illumination time of each selected column;

VILT0 ascends to logic level 1 with each five descents to logic level zero of the signal TEMC0; this signal causes the reset (VINR0-VINR3=0) of the subaddress generator 265 and remains at logic level 1 for a period corresponding to the time in which the signal TEMC0 stays at logic level 1. During the selection of the sixth column therefore the sub-address furnished to the ROM remains 0000. In response to this address the ROM outputs the code of the un-lit column which is stored in all the three stages 270c, 270b and 270a of the register 270. As a result the first column to succeed the five of the character matrix is not therefore illuminated;

VINP0 ascends to logic level 1 at the sixth descent to zero of the signal TEMC0 and actuates the interrupt generator 282 which sets to logic level 1 its output 30b. However it determines the flip-flop reset CAPCA (CAPCA=0), the protection unit activation 290 and the disactivation of the timing logic unit waiting for a new character CAP, for the display of the character adjacent to the one illuminated.

The sending frequency of CAP is less than 1 ms. The average frequency of illumination of all 21 display characters is therefore about fifty times per second. Only when the time interval between a CAP and the successive one exceeds 20 ms, is the display extinguished by the protection circuit for a maximum period corresponding to the average time for the execution of 21 CAP or about 21 ms. Therefore, it is understood that the character repetition frequency on the display is such that the observer, due to the persistence of a luminous image on the retina, observes an apparently continuous illumination of the display.

MAGNETIC-TAPE STORE CONTROL UNIT

The control unit 16 will not be described in detail herein as it is already described in the above mentioned U.S. Pat. No. 3,940,746.

It is sufficient to say that each line of character codes to be transferred in a magnetic memory block, according to the modalities described in the above mentioned patent, is stored from the central unit in a series of 128 cells M1=M128 of page 0 of the operative memory 42 called buffer memory 601 (FIG. 17). Each cell of the buffer memory is able to contain a character code of the line to be transferred.

PRINTER CONTROL UNIT 17

The control unit 17 will not be described in detail as it is of a type known in the art.

The control unit 17 is able to receive from the central unit 5 a character code and to cause the printing of a character corresponding to this code from the printer 11 and the consequent advancement of the writing head of a standard step (1/10 or 1/12 inches) or of plurality of elementary steps depending on the character printed (proportional writing) along the writing line. The selection between the various types of advancement is made manually by the operator by means of a proper selector of a known type.

The control unit is moreover able to receive from the C.U. all the commands typical of a printing control unit such as the carriage return, the interline advancement and the programmed shifting of the small writing head along the printer line.

It is sufficient to remember that each character sent from the C.U.5 to the printing control unit 17 is drawn from a zone of the operative memory 42 situated in page 0 (FIG. 17) comprising 128 cells S1-S 128 and called a printing buffer 602 (FIG. 17) which is able to store a line of character code to be printed. Also the characters of subroutines which handle the instructions coming from the printer to the central unit will not be described as the said subroutine is substantially of the type shown in the U.S. Pat. No. 3,940,746.

RECORDING PROGRAMME

The recording program is the group of instructions which are carried out in sequence by the central unit 5 in order to control the keyboard 6, the display 9, the magnetic memory 10 and the printer 11 during the introduction into the system of a text to be processed for its recording and printing in a draft form.

Figure 16A:
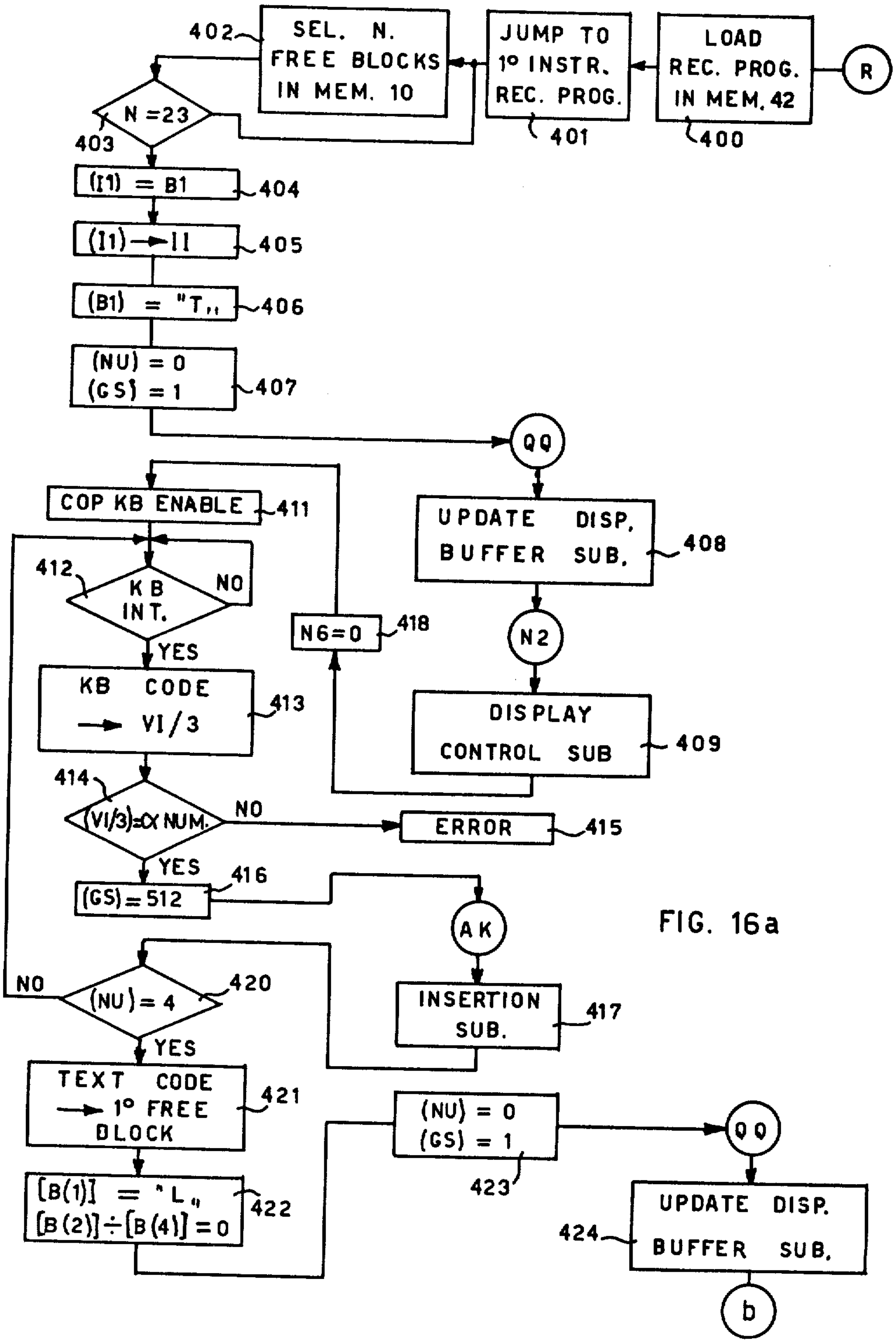
FIG. 16*a–d* are a flow chart of the recording programs.

According to what is described in the U.S. Pat. No. 3,940,746, the recording program is stored in the memory unit 10 and transferred to the operative memory 42 as a result of the entry of the key R (block 400 of FIG. 16a)

At the end of the memory loading of the recording program by the program BOOTSTRAP, a jump instruction (JMP) is carried out to the address in which the first recording program instruction (block 401) is stored.

According to what is described in the U.S. Pat. No. 3,940,746, the first recording program instructions are employed for the searching into the magnetic memory 10 of a determined number (for instance, 23) of free and recordable blocks (block 402) through a series of COP and CAP to the memory unit 10 and consequent interruption from the memory unit as well as with the CDP instructions to store in the operative memory the address of each block found.

At the end of the search of the 23 recordable blocks (N=23), the addresses of these blocks are recorded in proper cells of the operative memory 42. In these blocks will be sequentially recorded portions of the entered text (typically each line will be stored in a block of the magnetic memory).

During the execution of the recording program, the cells V1, V121 (FIG. 15) of the display assume the following functions:

V1-V15: display the fifteen successive last characters introduced from the keyboard into the display. In particular, the cell V15 always displays the last alphanumeric character introduced into the keyboard.

V16: is normally inoperative.

V17-V19: display a three cipher decimal number (V 19 unit, V 18 ten, V 17 hundred) representing the writing position reached in the limits of a writing line from the left margin preselected by the operator.

This number will be called the "numerator". The position of writing indicated by the numerator is always associated with cell V 15 in such a way that the character displayed from time to time in the cell V 15 occupies on the writing line the position indicated by the numerator. The maximum value of the numerator is equal to 128.

V 20-V 21: display codes representing operating states of the central unit. For the purpose of the present invention they can be considered as service cells able to inform the operator on the working state of the system.

During the execution of the recording program the following 10 bit cells of the operative memory 42 assume particular functions:

128 consecutive cells B (1)-B (128) of page 0 consitute the input buffer 600 (FIG. 17) in which are stored in sequence the characters of the text introduced via keyboard, the first character is stored in the cell B (1) the second in the cell B (2) and so on with the 128th character of a text line in the cell B (128).

Figure 27:
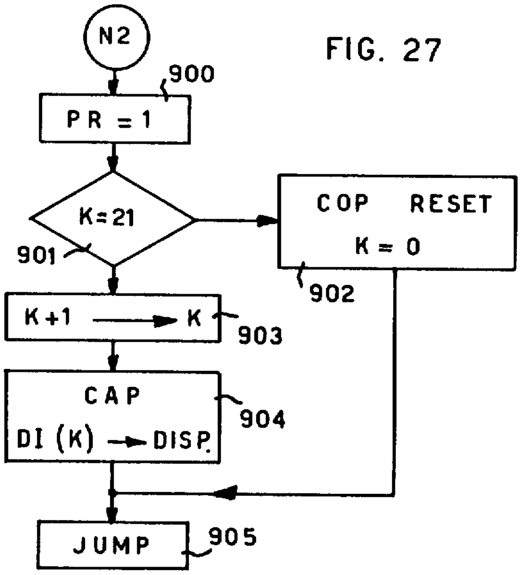
FIG. 27 is a flowchart of the display control unit execution subroutine.

21 consecutive cells DI (1)-DI (21) of ascending addresses of page 3 which constitute the display buffer 604 (FIGS. 17 and 27) and which are in correspondence with the cells V1-V 21 of the display and containing therefore the codes of the characters displayed in V1-V21.

1 cells I 1 which contains the address of the cell B(1) of the buffer 600.

1 cell II which stores the address of the cell B (i) of the buffer 600 from which the transfer of characters into the buffer 604 must start.

1 cell FF which stores the address of the cell B(i) of the buffer 600 which memorizes, during the last display cycle, the character transferred in the cell DI (15) of the display buffer 604.

1 cell NU which stores the numerator in binary code.

1 cell N6 which stores the number of characters effectively introduced in buffer 600, in binary code.

1 cell AN+1 which stores the number of characters defining the line length in binary code.

1 cell N7 which stores temporarily the content of N6.

1 cell NZ which stores temporarily the content of NU.

1 cell 17 which stores temporarily the content of II.

1 cell VI in which is stored the last character entered in the writing system from the keyboard 7 before its storage in the buffer 600.

1 cell 6X in which is stored the automatic underlining state introduced through the entry of the key 508: that is, in the cell 6X the code 0000000010 is stored when the automatic underlining state is selected (SOT=1), while the code 0000000000 is stored when this command is cancelled (SOT=0).

128 consecutive cells of page 0 (S (1)-S (128) constitute the printing buffer 602 (FIG. 17) in which is stored a line of characters introduced and displayed and from which are extracted one by one the character codes which are sent to the printing control unit for the serial printing of the corresponding characters.

1 cell GS of page 3, in which is stored a code able to define if the characters which will be displayed will be right justified ((GS)='512, last character displayed by V 15) or left justified ((GS)='1, first character displayed by V 1).

According to the internal rules of the system the messages sent by the machine to the operator to guide the work will be left justified while the portions of text introduced for recording will always be right justified.

128 consecutive cells R (1)-R (128) constitute the buffer for the "preceding line" 603 which stores the line of text previously contained in the buffer 600.

In the recording program, different subroutines (or routines) are provided. That is, different groups of instructions are carried out sequentially more than one time during the program execution.

According to the invention, between these subroutines, the ones which refer to the running of the display will be completely described.

These latter are called:

Display data input subroutines. During the execution of the program, each time an interrupt request is received from the display control unit, a branch is made to the subroutine. The subroutine transmits sequentially the codes contained in the display buffer D (1)-D (21) to the display control unit.

The starting address of this subroutine is N2 of page 3. The output address is Z 1 of page 3;

Subroutine of character code insertion into the input buffer B (1)÷B (128):

Starting address=AK of page 3

Output address=ZZ of page 3;

MA Key entry subroutine:

Starting address=VG of page 3

Output address=ZZ of page 3;

BK Key entry subroutine:

Starting address=VG of page 3

Output address=ZZ of page 3;

CL Key entry subroutine:

Starting address=VH of page 3

Output address=ZZ of page 3;

RC Key entry subroutine:

Starting address=FS of page 3

Output address=ZZ of page 3;

Manual underlining subroutine

Starting address=PL of page 3

Output address=ZZ of page 3;

Display buffer updating subroutine D (1)÷D (21)

Starting address=QQ of page 3

Output address=ZZ of page 3;

Each of these subroutines will be listed in detail hereinafter.

Figure 18:
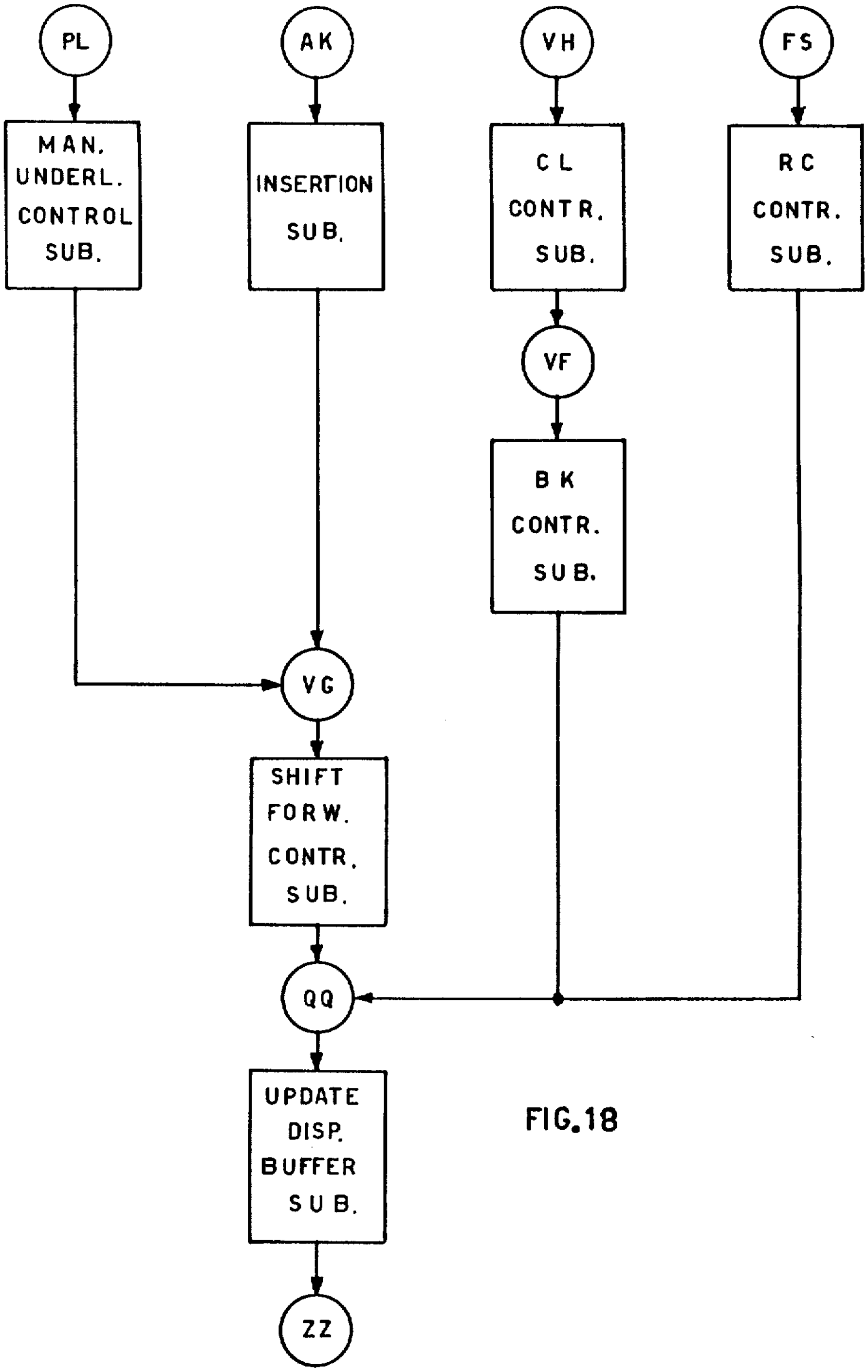
FIG. 18 is a flow chart relating to the connections between the various subroutines.

FIG. 18 represents the connection between the various subroutines above listed. All the subroutines include the display buffer updating subroutine.

DISPLAY BUFFER UPDATING SUBROUTINE

The task of this subroutine is to effect transcodification in display code, as well as the loading of character codes to be displayed into the display buffer cells DI (1)-DI (21), according to the information given by the content of the cells II, CS and N11.

Figure 19:
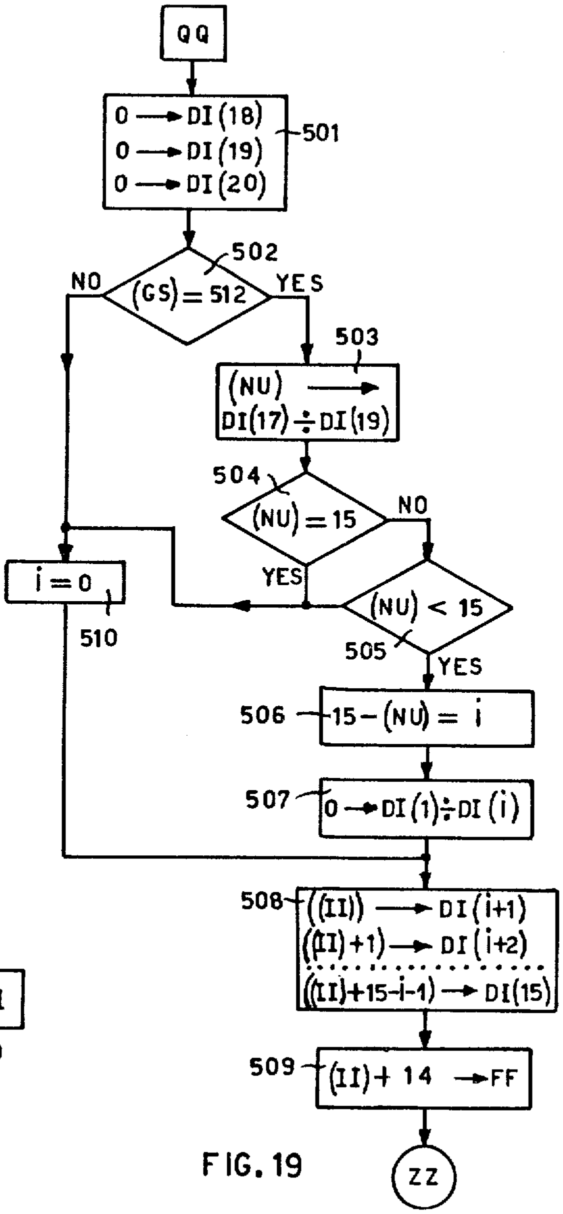
FIG. 19 is a flow chart of the updating subroutine of the display buffer.

This subroutine flow chart is represented in FIG. 19.

The block 501 inserts a non-lit cell code in the cell DI (18)-DI (20).

The decisional block 502, successive to the block 501, makes a branch to the block 510 if the content of the cell GS is not 512, that is if (GS)=1 and the left justification is requested. If, in the opposite case, (GS)=512, then it branches to the logic block 502 for decimal decodification and storage in DI (17), DI (18), DI (19) of the decimal cipher of the numerator contained in the cell NU.

At the end of the execution of the functions in logic block 503, the functions of the logic forks 504 and 505 sre carried out to verify if the numerator contained in NU is less than 15 or not. In the first case it branches to logic block 506 and in the second case it passes to logic block 510. In the logic fork 506, the difference "i"=15 - (NU) is calculated.

In the block 507 successive to 506, the transfer of the constant "0", corresponding to the code "non-lit cell" for the display, is effected in the first "i" cells of the display buffer from DI (1). In fact, if the condition is right justified (GS=512) and if the number of characters to be displayed is less than 15, for instance (NU)=10, then the first five cells VI–V5 of the display corresponding to the cells DI (1)–DI (5) of the display buffer 604 will be not be lit and "i" represents the difference between 15 and the number contained in NU.

If, in the opposite case, (GS)=1 or (NU) in greater than or equal to 15 then the logic blocks 506 and 507 will be by-passed and, before passing to the execution of the block 508, the indicator "i" defined hereinbefore is zeroized.

In the block 508, a series of instructions are carried out which result in transferring the contents of the cells of buffer 600, the addresses of which are stored in cell II through cell (11)+15-i-1), respectively, to the cells DI (i+1)–DI (15) of the buffer 604. In that way fifteen consecutive characters of buffer 600 are transferred from the cell (II) if NU is greater than or equal to 15, or if 15−i=NU.

At the end of this subroutine (block 509), the address of the cell of buffer 600, the content of which has been transferred to DI (15) having the address: (II)+14, is transferred to the cells FF.

DISPLAY CONTROL SUBROUTINE

This subroutine sends the character codes stored in the display buffer DI (1)–DI (21) by the subroutine previously described to the display control unit 15 one by one.

This subroutine starts each time an interrupt request (FIG. 27) is made. The subroutine begins at the address N2. The display control unit 15 sets PR=1 to provide the protection from other instructions (block 900) therefore it if an indicator K is equal to 21 (logic fork 901), a display reset instruction COP is executed and the indicator K (block 902) is zeroized. In this case, a re-entry branch is the executed (block 905) by means of the JUMP instruction. On the other hand, if K≠21, K is incremented by one (block 903) and the content of the cell DI (K) of the buffer 604 is sent to the display control unit 15 on channel 46 by means of a "CAP instruction" (block 904).

Therefore, this subroutine successively sends the character codes to be displayed to the display control unit 15 when each interruption is received by the display control unit. When the 21st and last character has been sent, is also effects a reset COP. At the next interruption, it starts again to send the character codes of the buffer 604 beginning with the first one.

SHIFT FORWARD EXECUTION SUBROUTINE

As already mentioned, when pressing the MA shift forward key the following occurs:

(a) The characters on the display are shifted by one position towards the left with the disappearance of the character previously displayed by the cell V1 as well as the apperance of a new character of the line in the cell V 15.

(b) The increment by one unit of the numerator. The shift forward key is active only if the character displayed in the cell V15 of the display is not the last character of the text line, otherwise, its actuation causes an error signal by the keyboard buzzer.

Figure 20:
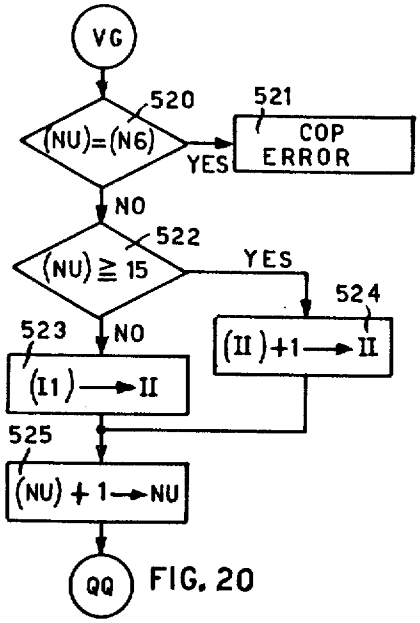
FIG. 20 is a flowchart of the subroutine of shift forward execution MA.

The subroutine (FIG. 20) which executes the shift forward function starts by sending the VG address to the decisional block 520. In block 520, the numerator of the writing position contained in NU is conpared with the number of characters already stored in N6 of the input buffer 600. If the comparison is positive, the display cell V15 already visualizes the last character stored in the input buffer and a COP is executed to activate buzzer (block 521). If NU≠N6, the subroutine advances to logic fork 522 to verify if NU is≧15. In the positive case it branches to block 524 where the content of cell II is incremented by one and successively it branches to block 525 where the numerator contained in NU is incremented by one. If NU<15, there is a transfer of the address of the first cell of the input buffer from I1 to II (block 523) and then the block 525 increments the numerator by one.

It is therefore understood that the address 0 of the input buffer cell contained in II is incremented by one only if NU≧15, that is, only if the number of characters previously displayed equals 15, while in each case the numerator is incremented by one.

The shift forward execution subroutine is carried out not only as a result of the MA key entry, but also during the execution of the character code insertion into the input buffer subroutine, as described hereinafter.

In the FIGS. 21, **21*a* and 21*b*, the effects on the display of the shift forward key entry are represented, assuming that the twenty-eight characters (spaces included) are already contained in the input buffer (FIG. 21**).

THIS IS A TEXT EDITOR

Also, assume that before the first MA key entry, the numerator has the value 018 (FIG. **21*a***). Therefore, as can be seen, the portion displayed is as follows:

S IS A TEXT EDI with the letter I corresponding to the eighteenth position displayed by the cell V15. The actuation of the MA key causes a shift one place towards the left of the portion displayed (FIG. **21*b***).

IS A TEXT EDIT

The cell V15 displays the letter T and increases by one unit the numerator which becomes 019 so that the nineteenth writing position is displayed by the cell V15.

SUBROUTINE OF A CHARACTER CODE INSERTION INTO THE INPUT BUFFER B (1)–B (128)

This subroutine carries out:

The insertion of an alphanumeric character code entered via the keyboard and already processed by care of the main recording program into the buffer 600 to the cell addressed by the content of the cell FF, if the alphanumeric character is the first to be stored into the input buffer (that is, if the content N6 is=0), or by the content of the cell FF incremented by one, if (N6)≠0.

A shift forward operation, as previously described, successive to the insertion.

During its execution, this subroutine carries out the following checks:

(1) If the number of the alphanumeric codes already inserted in the buffer 600 is equal to the maximum number of characters predetermined for the text line and if the numerator indicates the last writing position within the limits of this predetermined line length, then an error signal occurs.

(2) If the' character to be inserted in the buffer 600 should be underlined because the automatic underlining condition is checked, the bit 8 of the alphanumeric code to be inserted is set at one.

Figure 22:
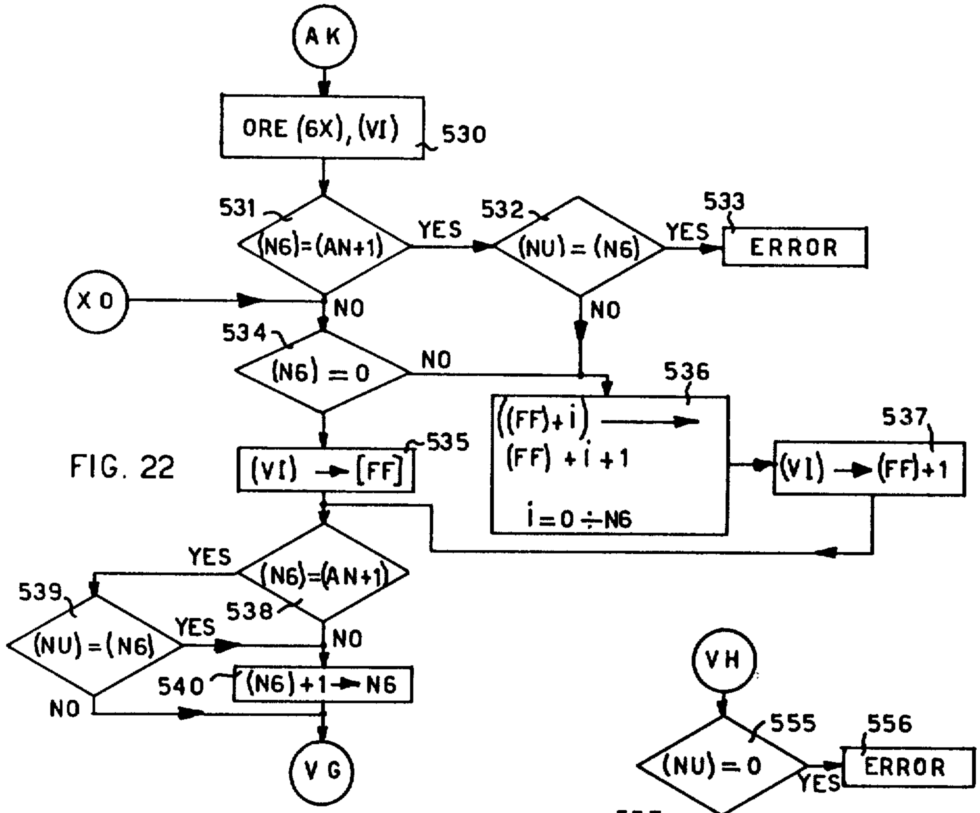
FIG. 22 is a flowchart of the subroutine of character insertion in the display buffer.

The flowchart of this subroutine is represented in FIG. 22, the character code to be inserted is stored in the cell VI of FIG. 3.

The subroutine starts with an instruction ORE (block 503) by means of which the underlining information (bit 8) is inserted in the buffer according to the content of the cell 6X which, has already said, stores the automatic underlining condition.

Then a comparison is executed between the number of characters already inserted in the input buffer (contained in cell N6) and the maximum number of characters inscribable in a text line (contained in AN+1) (logic fork 531;) if the comparison is negative, then it branches to the logic fork 534. If the comparison is positive; a check is carried out to determine whether the numerator has the same value as N6 (logic fork 532).

Also, if this further check is positive, since the insertion in the input buffer of this character will make the total number of characters greater than the number established by the content of AN+1, an error signal is carried out with a COP instruction activating the buzzer.

If after the error signaling, the operator decides to insert the last character, then he will push the free margin key as in the normal writing machine operation to carry out this subroutine without any more error signals since the re-entry of this subroutine will occur at the XO address.

If (N6)=AN+1, the numerator is less than (N6). As a result, the character code is inserted between two character codes already stored in the buffer. The insertion operation is effected (block 536) which results in the loss of the last character code of the writing line. At the XO address a COC instruction is executed for checking if (N6)=0 is carried out (logic fork 534).

If (N6)=0, the subroutine branches to block 535 to insert the character code contained in cell VI in the input buffer 600 at the address stored in the cell FF (which, as was seen from the buffer updating routine coincides with the cell B1 of buffer 600). Therefore the subroutine passes to the logic fork 538.

If, (N6)≠0, then all the characters contained in the buffer 600, beginning with the cell having the address equal to the content of FF increased by 1 and ending with the last cell of the buffer 600 containing a character code (block 536), are shifted to the right one phase.

During this process, practically all the characters of one writing line successive to the writing position indicated by the numerator, are shifted one place towards the right.

At the end of the shift, the character code stored in the cell VI is inserted in the cell of the buffer 600 successive to the one whose address is stored in FF (block 537).

The subroutine then passes therefore to logic blocks 538, 539 and 540 to increment the content of NU by one except in the case in which (N6)=(AN+1) (logic fork 538, output YES and (NU)≠(N6) (logic fork 539 output NO) since, in this case, the loss of the last character of the buffer 600 occurs. Thereupon the branch to the address AG of the shift forward execution subroutine is effected.

In FIG. 21 f-21 i, the effect on the display of the execution of this insertion subroutine as a result of the entry of the T alphanumeric key (in case (NU)≠N6), is shown. For example, the condition preceding the key-T entry is the one in which 21 characters are contained in the buffer (comprising the space characters): THIS IS THE TEXT EDIOR (FIG. **21*f*) and in which the numerator has the value 020. Therefore, as is seen in FIG. 21*g*, the portion displayed is: IS THE TEXT EDI with the letter I which occupies the twentyeth writing position, displayed by the cell V15. The entry of the key-T and the execution of the insertion subroutine cause, in the buffer 600**, the shift of one place towards the right of the characters O and R as well as the insertion before O of the letter T:

THIS IS THE TEXT EDITOR (FIG. 21*h*), and in the display, the shifting towards the left of one place of the displayed portion, for which the letter T inserted will be displayed by the cell V15 and the numerator (020) will be incremented by one unit:

S THE TEXT EDIT (FIG. 21*h*).

BACK SPACE KEY EXECUTION SUBROUTINE

As already mentioned, for each BK key entry, the following occurs:

(a) The shifting of the characters visualized by the display in the cells V1–V15 of one place to towards the right with the disappearance of the character which before, at the entry of BK, was displayed by the cell T15.

(b) The decrease by one unit of the numerator.

When the BK key is inactive, its entry produces an error signal by the buzzer if the numerator equals zero.

Figure 23:
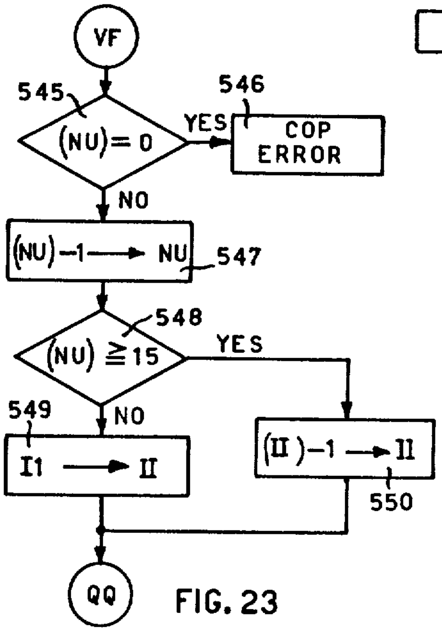
FIG. 23 is a flowchart of the back-space BK execution subroutine.

The flow-chart of the back space key subroutine is represented in FIG. 23.

This program starts with the logic fork 545 to check whether (NU)=0. In the positive case, the branch is effected to block 546 where, as already mentioned, a buzzer is actuated to produce signaling procedure errors.

In the opposite case, the block 547 is executed to decrement the numerator by one unit.

Then, by the logic fork 548 the numerator (NU) is checked to determine if it is greater than or equal to 15. In the negative case ((NU)<15) the transfer of the buffer starting address from the is executed to the cell II (block 549) and then a branch is executed the address QQ where the display buffer updating subroutine will be executed. In the opposite case ((NU)≧15), before branching to the address QQ, there is the decrement of one unit of the content of the cell II which is the address of the cell of the input buffer from which to start the display buffer updating (block 550).

FIGS. 21, 21*a*, 21*c* show the effect on the display of the BK key entry and of the resulting execution of this subroutine with the same initial conditions of the display already described as regards the MA execution routine and represented in FIGS. 21, 21*a*. After the entry, the numerator is decremented by one and the position displayed is IS IS A TEXT ED (FIG. 21*c*)

CANCEL KEY EXECUTION SUBROUTINE

For each cancel key entry the following effects are obtained on the display and in the buffer:

(1) The character displayed by the cell V15 of the display, and stored in the cell of the buffer 600, the address of which is stored in FF, is cancelled from the buffer 600. All the characters of the buffer 600 successive to the cancelled character are shifted one place towards the left (that is, in the sense of the decreasing addresses) and the numerator will be decremented by one.

(2) After the key entry, the display 9 will visualize the same characters that it would have displayed as a result of the entry of the key BK, but in the buffer there will be one character less.

Besides the shift of the characters towards the left in the input buffer 600 in order to cancel a character, the other effects of the cancel key are similar to the ones of the key BK since this subroutine recalls the back space execution subroutine.

Figure 24:
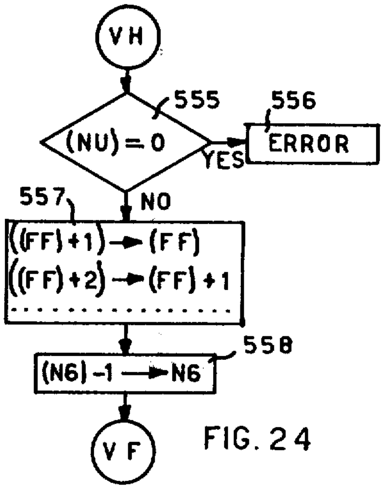
FIG. 24 is a flowchart of the cancellation CL execution subroutine.

The flowchart relative to this subroutine is represented in FIG. 24. The subroutine starts with the logic fork 555 which verifies if the numerator (NU) is zero and, in the positive case, it branches to block 556 which carries out a COP instruction actuating the buzzer in the manner described in other subroutines.

In the negative case, (NU)≠0, the groups of instructions of the block 557 are carried out to shift the content of each cell of the input buffer to the left one place starting from the cell having the address corresponding to the content of FF increased by one unit.

At the end of the execution of block 557, the content of N6 (block 558) decrements by one unit since one character from the buffer has been cancelled, and a branch is effected to the address VF of the BK execution subroutine.

FIGS. 21, 21*a*, 21*d* and 21*e* show the effect of the cancel key on the display and on the input buffer 600 assuming the initial conditions of FIGS. 21 and 21*a*. As seen in FIG. 21*d*, after the entry of this key, the display condition is similar to the one resulting from the entry of the BK key but the input buffer has the content shown in FIG. 21*e* which is now THIS IS A TEXT EDITOR.

UNDERLINING EXECUTION SUBROUTINE

This subroutine is carried out as a result of the entry via the keyboard of the underlining key to cause the underlining of the character displayed by the cell V15 of the display and the successive space forward shift of the display. The subroutine causes an error signal if the underlining key is entered in absence of characters on the display (NU=0) and if the automatic underlining key is entered and the underlining of the last character entered in the buffer (NU=N6) is requested.

Figure 25:
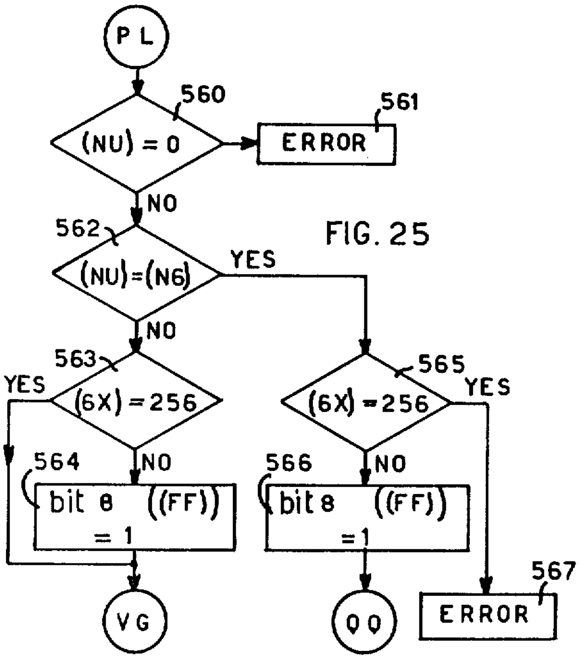
FIG. 25 is a flowchart of the subroutine for the manual underlining execution.

This subroutine flow chart is represented in FIG. 25. The subroutine starts with the execution of the logic fork 560 to check whether (NU)=0. In the positive case, it branches to the execution of the error instructions COP buzzer (block 561). If (NU)≠0, then the subroutine verifies if (NU)=(N6) (logic fork 562). The content of the cell 6X is 0000000010 (256) is checked to determine if the character stored in the cell of the input buffer (600), the address of which is stored in FF, already has the underlining code (bit 8=1) (logic fork 563) (6X stores the underlining state). If it has the underlining code, the subroutine branches directly to the shift forward execution subroutine. If not, the subroutine places 1 in the bit 8 of the stored character through the ORE instruction (block 534) and then it branches to the shift forward execution subroutine.

On the other hand, in the case in which (NU)=(N6) and (6X)=256 (logic fork 565), the subroutine branches to the error signaling instructions (block 567) while if (6X)=0, that is, if the character is not already underlined, the underlining is effected with the ORE instruction (block 566) and then it branches to the display buffer updating subroutine.

RC EXECUTION SUBROUTINE

This subroutine is carried out as a result of the entry of the return-carriage RC key and carries out the RC function for zeroizing the numerator to erase the characters from the display.

Figure 26:
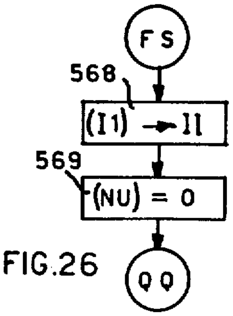
FIG. 26 is a flowchart for the carriage return RC execution.

The subroutine, the flow chart of which is shown in FIG. 26, is composed of block 568 of which causes the cell II to store the address of the first cell of the input buffer. In block 569 the numerator is zeroized, and the subroutine branches to the display buffer updating subroutine which inserts in (DI (1)-DI (15)) the code of the unlit cell (or of space) and in DI (17)-DI (19) the code corresponding to the character "0" for the numerator.

PRINCIPAL RECORDING PROGRAM

The operations carried out by the principal recording programs are described hereinafter with reference to the flowchart of FIGS. 16*a*–16*d* upon the conclusion of the operation of free and recordable block research (logic blocks 402 and 403).

At the end of this operation, the recording program causes the first cell B(1) of the input buffer 600, the address of which is stored in II, and in II to store the code of the letter T (block 404–406) in the display codification. It sets the numerator=0 (NU)=0 and the left justified condition (GS)=1 (block 407) and then recalls the execution of the display buffer updating subroutine (block 408) and as a result the display control unit execution subroutine (block 409).

In this way, the display 9 displays in the cell V1 the letter "T" which signals to the operator that the system is ready to receive the reference text.

Of course, the display control unit execution subroutine, once started continue to be carried out each time an interrupt will comes from the display control unit 15 in a way therefore asynchronous in respect to the recording program execution.

The reference text that the operator must enter to specify the text that will be then introduced in the system is a word of four alphanumeric characters. Accordingly, the recording program sends a COP instruction to the keyboard control unit (block 411) and waits for an interruption request from the keyboard control unit 14 (logic fork 412) after having zeroized the content of N6 (block 418).

Upon arrival of interruption from the keyboard control unit 14, by the execution of a CDP, it loads the character code sent from the keyboard control unit 14 into the cell VI of page 3 (block 413).

Then the recording program checks, by means of a series of logic instructions AND, ORE and COP, if the code loaded into the cell VI corresponds to an alphanumeric character (logic fork 414). In the negative case, a COP buzzer actuation (block 415) is carried out which signals the procedure error to the operator. In the positive case, the right justified condition (GS)=512 (block 416) is set and, therefore, the character insertion subroutine for the input buffer 600 is executed (block 417) which, as previously described, recalls the display buffer updating subroutine. After the repeated execution of the display control unit execution subroutine, the display displays the first alphanumeric character in the cell V (15) and the value 001 for the numerator. The program goes on with a COC comparison instruction to verify if the content of NU is equal to 4 (that is, if all the four characters of the text code have already been entered) (logic fork 420).

If it is not, it awaits a new interruption from the keyboard control unit. When it occurs, it will effect again the instruction cycle defined by blocks 413–420.

Correspondingly, the display will display each of the characters entered in the cell V 15 to cause a shift towards the left of the characters previously entered after the insertion of each character. When NU=4 and the reference text is completed, the program stores the reference text in the magnetic memory (block 421) (FIG. 16*b*) at the address of the first free block by means of a series of COP and CAP instructions to the magnetic memory unit 10.

At the end of this operation, the recording program stores in the first cell B (1) of the input buffer 600 the codes corresponding to the letter "L" in display codification. The recording program also zeroizes the cells B (2)–B (4) and NU and newly sets the left justified condition (GS)=1 (block 422). Then it recalls the display buffer updating subroutine (block 424) by which, at the end of the execution of this subroutine, the display buffer cell DI (1) stores the code of the letter "L". The display control unit execution subroutine causes the display of the letter "L" in the cell V (1) while all the other cells V (2)–V (21) are extinguished. The displayed letter "L" informs the operator that he has to enter via the keyboard a number between 1 and 128 which represents the length of the writing line for the recorded text in terms of the number of characters inscribable on the line. The completion of the entry of this number will have to be followed by the entry of the RC carriage return key.

To this end, the recording program sets (NU)=0, (N6)=0 and (GS)=512 (block 425) and finally enables the keyboard by means of a COP instruction. Then it waits for an instruction from the keyboard control unit as a result of a key entry (logic fork 426).

When the interruption occurs, it executes a CDP instruction to read the keyboard and stores the code corresponding to the entered character in the cell VI of page 3 (block 427). Then, it executes a series of logic instructions COC, AND and ORE to check whether or not the code corresponds to a numeric character (block 428) or to the code RC (logic fork 429). If not, a COP instruction to the buzzer (block 430) is executed to signal an error to the operator. If the code is a numeric character, the input buffer character insertion subroutine (block 432) is executed and, at the end of the subroutine, the display visualizes in V (15) the cipher entered.

The numerator then is incremented by one and the cipher is stored in the first cell B (1) of the input buffer 600. The program then waits for an interruption from the keyboard control unit. When an interruption occurs blocks 427–433, display a new cipher in V (15) while the previous one is displayed in V (14). The numerator is incremented by one and the second cipher is stored in the second cell of the input buffer 600. This operation continues for the third cipher which will be stored in the cell B (3) of the input buffer 600.

When the character entered is a carriage return (logic fork 429) indicative of completion of the set of numbers defining the length of the line, the recording program executes instructions COC, AND and ORE to cause the transcodification of the codes representing the decimal number contained in the first 3 cells B (1)–B (3) of the input buffer. This transcodification results in a unique binary code of 10 bits representing the number entered via the keyboard (block 435). This code is therefore stored in AN+1 (block 436) and, as already seen, is compared with the content of N6 for each execution of the character insertion subroutine previously described. At the end, the cells (NU) and (N6) are set: (NU)=0 and (N6)=0 (block 434).

Figure 16B:
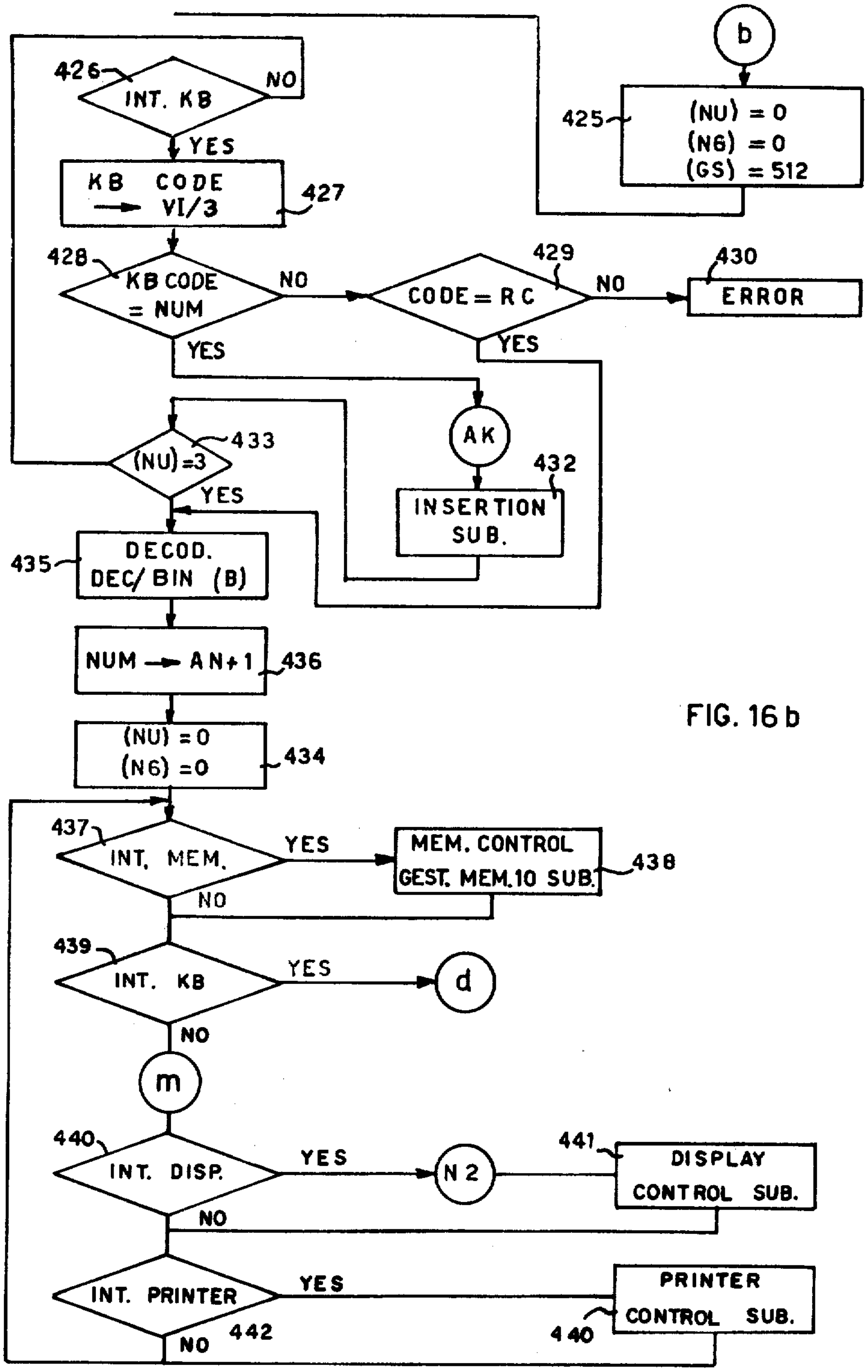
Figure 16C:
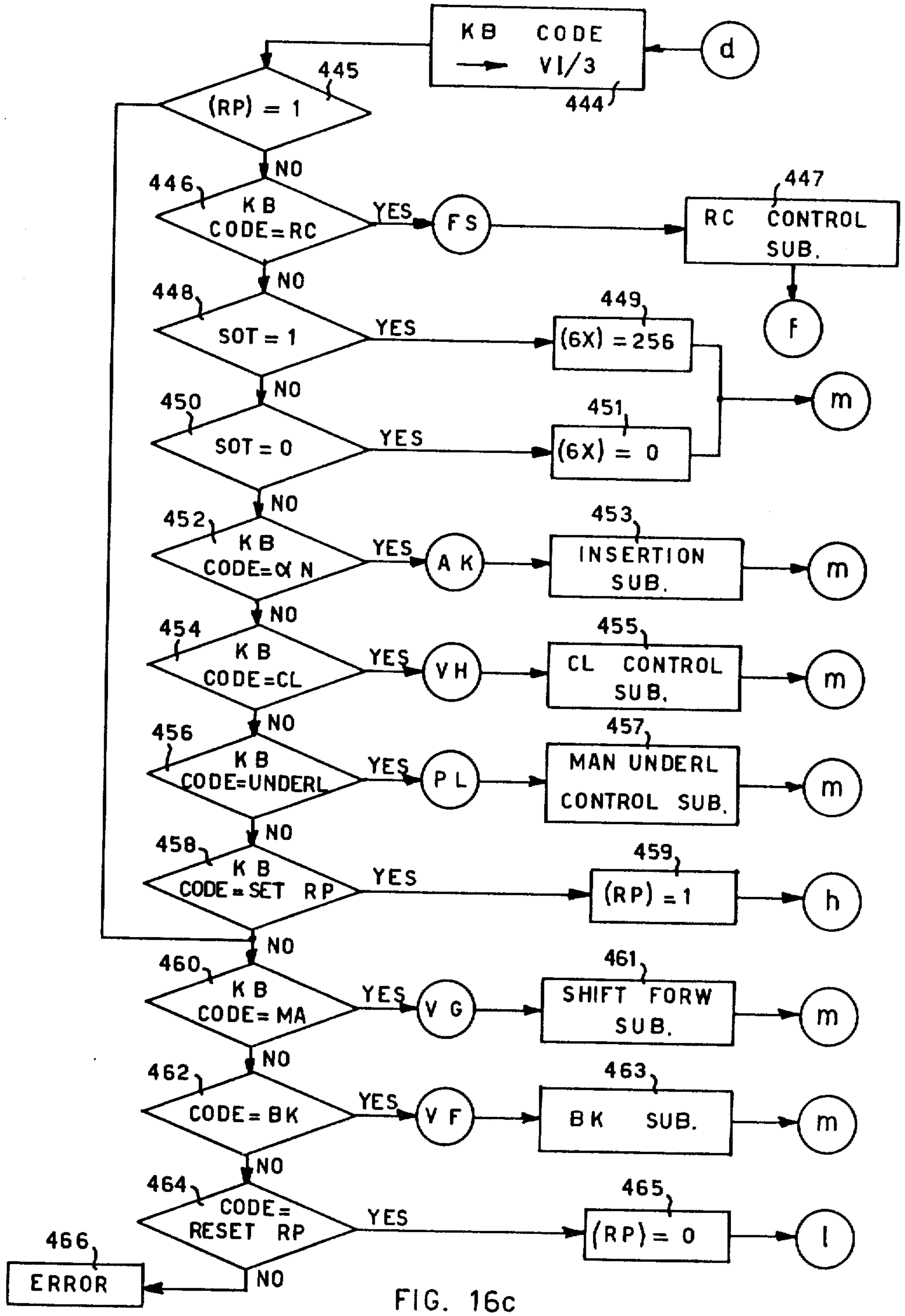

After these preliminary operations which define the text and the writing line length, the operator can start entering the characters of the text that he intends to record into the system. To this end, the recording program waits for an interruption from the keyboard. More precisely, from this point the recording program effects a closed "loop" (FIG. 16): first it checks for pending interruptions from the memory control unit 10 (logic fork 437). If this is verified (output YES of the fork 437), then a branch instruction is executed to jump to the subroutine which serves the above interruption (block 438) and at the end of the execution of this subroutine it returns to the inside of the loop. If there is no pending interruption from the memory 10 (output No of the fork 437) then the program checks if there is a pending interruption from the keyboard control unit (logic fork 439). In the negative case (output NO), it checks if there is an interruption coming from the display control unit (logic fork 440), and in the positive case (output YES) executes the display control unit execution subroutine. At (block 441) the end of the execution of this latter subroutine, the program returns back inside the loop. In the negative instance (output NO), it checks if there is a pending interruption coming from the printer control unit (logic fork 442) and, in the positive case (output YES), executes a branch instruction to the subroutine able to execute this last interruption (block 443) while in the negative case (output NO) it executes a branch to the logic fork 437 to restart the loop. When the verification of the presence of an interruption coming from the keyboard control unit gives a positive result (output YES of the logic fork 439), the program goes on with the flowchart of FIG. 16*c* in which a CDP instruction from the keyboard control unit is executed which stores the code of the entered characters in the cell VI of page 3 (block 444). Then the program executes a COC instruction to check if the content of the cell RP is equal to 1 (logic fork 445), that is, whether the RP key is in its active position or not. Now this is surely not the case if the operator is entering the first line of the text, as is the hypothesis of the description made up to now. However, the flowchart of FIG. 16*c* is valid for any line of the text being entered. This description is applicable regardless whether the line of text is the first, or not. If (RP)=0 (output NO of the logic fork 445), then the program executes a series of logic instructions AND, ORE, COC, CFR and SCA to recognize the entered key code.

If the code corresponds to an alphanumeric character (logic fork 452-output YES) the programme branches to the execution of the character insertion subroutine (block 453) in the input buffer 600. The display buffer 604 updating subroutine is recalled and at the end of the execution of these subroutines, a branch instruction is executed to the point m of the loop of FIG. 16*b*. Upon successive execution of the display control unit execution subroutine, the display 9 will visualize the character entered in the cell V 15 and will effect a shift towards the left of the characters previously entered.

If the entered key code corresponds to one of the following commands: MA shift forward (logic fork 460, output YES), back-space BK (logic fork 462 output YES), or manual underlining (logic fork 456 output YES), then the program branches to the subroutines already described for each of the these keys (blocks 461, 463, 454, 456) after which a branch instruction is executed to the point m of the loop of FIG. 16*b*. Again, upon successive execution of the display control unit execution subroutine, the display will visualize the entry of these keys.

If the code corresponds to the automatic underlinging key actuation (SOT=1) (logic fork 448, output YES) or to the disactuation of this same key (OT=0) (logic fork 450, output YES), then the recording program stores the code '256 in the first case (block 449) or the code '0 in the second case (block 451) in the cell 6X. A branch to point m of the loop of FIG. 16*b* is then executed.

Figure 16D:
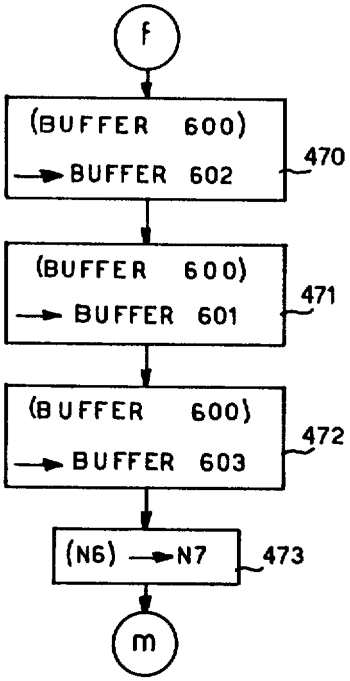
Figure 16D:
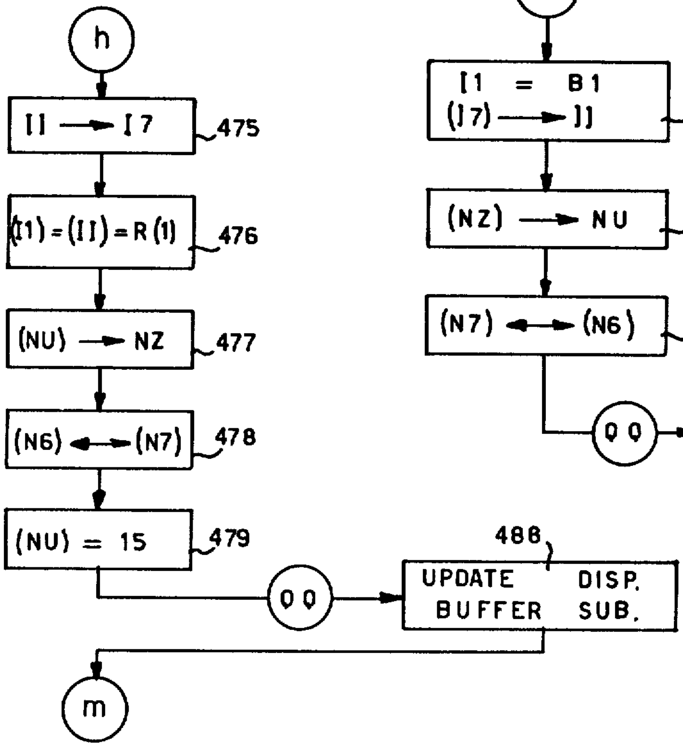
Figure 16D:
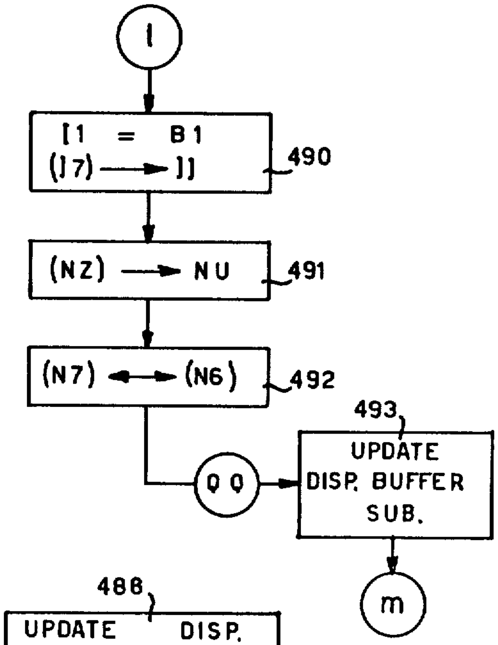

If the code corresponds to the RC key actuation (logic fork 446, output YES), then corresponding subroutine, previously described, is executed. A branch to point f of FIG. 16*d* is executed where the content of the input buffer 600 is transferred to the printing buffer 602 (block 470) and then to the memory buffer '601 (block 471) and finally to the previous line buffer 603 (block 472). The content of the cell N6 is transferred into the cell N7 (block 473) and the program re-enters at point m of the loop of FIG. 16*c*. In this way, the line of entered characters has been stored in the memory and printing buffers 601 and 602 at the disposition of the service subroutines of the memory control unit (block 438) and of the printing control unit (block 443). The interruptions at blocks 438 and 443 cause the storage of the entered line of text in the magnetic memory and the printing of this line, respectively.

Obviously, the program provides for a series of instructions not described in the flowchart to check that the storing operation and the printing of the line previously stored in the buffers 601 and 602 are already finished before effecting the transfer of this new line of characters in the buffers 601 and 602. This is certainly verified since the manual entry of a new line normally requires a period of time very much longer than that required for the storage and/or the printing of a line from the respective subroutines (blocks 438 and 443).

With the execution of the RC key subroutine, the cells VI–V16 of the display are lit and the cells V17–V 19 display the cipher "0". At this point the operator will be able to start the entry of a new line of text, while, according to the invention, contemporaneously and in superposition to this entry, the printer 11 will print the line previously posted. This is apparent from the description of the flow-chart of the recording program (particularly FIG. 16*b*.).

If the code of the key corresponds to the actuation of the previous line key RP (set RP) (logic fork 458, output YES), then the content of II is transferred the cell 17 and the code "1" the cell RP of the memory 42. The following sequence of operations then occurs (point h of FIG. 16). The address of the cell R (1) of the buffer 603 is stored in the cell II and I1 of page 3 (block 476). The content of NU is transferred to the cell NZ (block 477). The content of the cell N6 is exchanged with that of cell N7 (block 478). The number "15" in binary is stored in the cell NU (block 479). Then the display buffer updating subroutine (block 480) is executed and, due to the addresses stored in II and in I1, the characters to be loaded in the first fifteen cells DI(1)–DI(15) of the buffer 604 will come from the previous line buffer 603 rather than buffer 600. Since, at the end of this subroutine, the re-entry to the point m of the loop of FIG. 16*c* is effected, the display control unit execution subroutine (block 441), when executed, will cause the display of the first fifteen characters of the line previously entered and contained in the buffer 603. The cells I7, NZ and N7 act as temporary memory for the cells II, NU and N6, respectively, in order to save the values contained in these cells which refer to the line presently being entered.

When the RP key is in the active position (set RP), it is only possible to use the keys MA and BK. The disactuation of the same key RP (reset RP) permits examination through the display 9 of the preceding line without otherwise altering the content. Concurrently, if RP=1 (logic fork 445, output YES), the recording program permits the successive entry only of the keys MA, reset RP and BK (logic forks 460, 462 and 464), and if other keys are actuated, a procedure error is signalled by means of a buzzer (block 466).

Finally, if the actuated key corresponds to the disactuation of the RP key (reset RP) (logic fork 464, Output YES), the code "O" is stored in the cell RP and a sequence of operations opposite to the one described above as regards the actuations of the RP key (set RP) is executed. At point i of FIG. 16*d*, the content of cell 17 is transferred to cell II, the address of cell 17 is stored in II, and the address of cell B1 of buffer 600 is stored in I1 (block 490). The content of the cell NZ is transferred to NU (block 491). The contents of cells N6 and N7 are exchanged (block 492). The display buffer updating subroutine (block 493) then is executed. The character codes extracted from the input buffer 600 ((I1)=B1) are thereby retransferred to the first 15 cells D1 (1)–D (15) of the display buffer 604. Finally, the subroutine returns to point m of the loop of FIG. 16*c* so that the display control unit execution subroutine will send the character codes to the display which belong to the line being processed.

PRINTING STATE

HYPHENATION ROUTINE OF THE PRINTING PROGRAM

The printing program is loaded into the memory 42 of the C.U. upon depression of the P key of the service keyboard 8 in a manner similar to the loading of the recording program. The printing program controls the printing of a previously recorded text identified by the name entered from the keyboard according to a text format also entered from the keyboard.

The printing can be effected with the well known right hand margin adjust method with a selectable hot zone preceding the right hand margin.

Figure 28A:
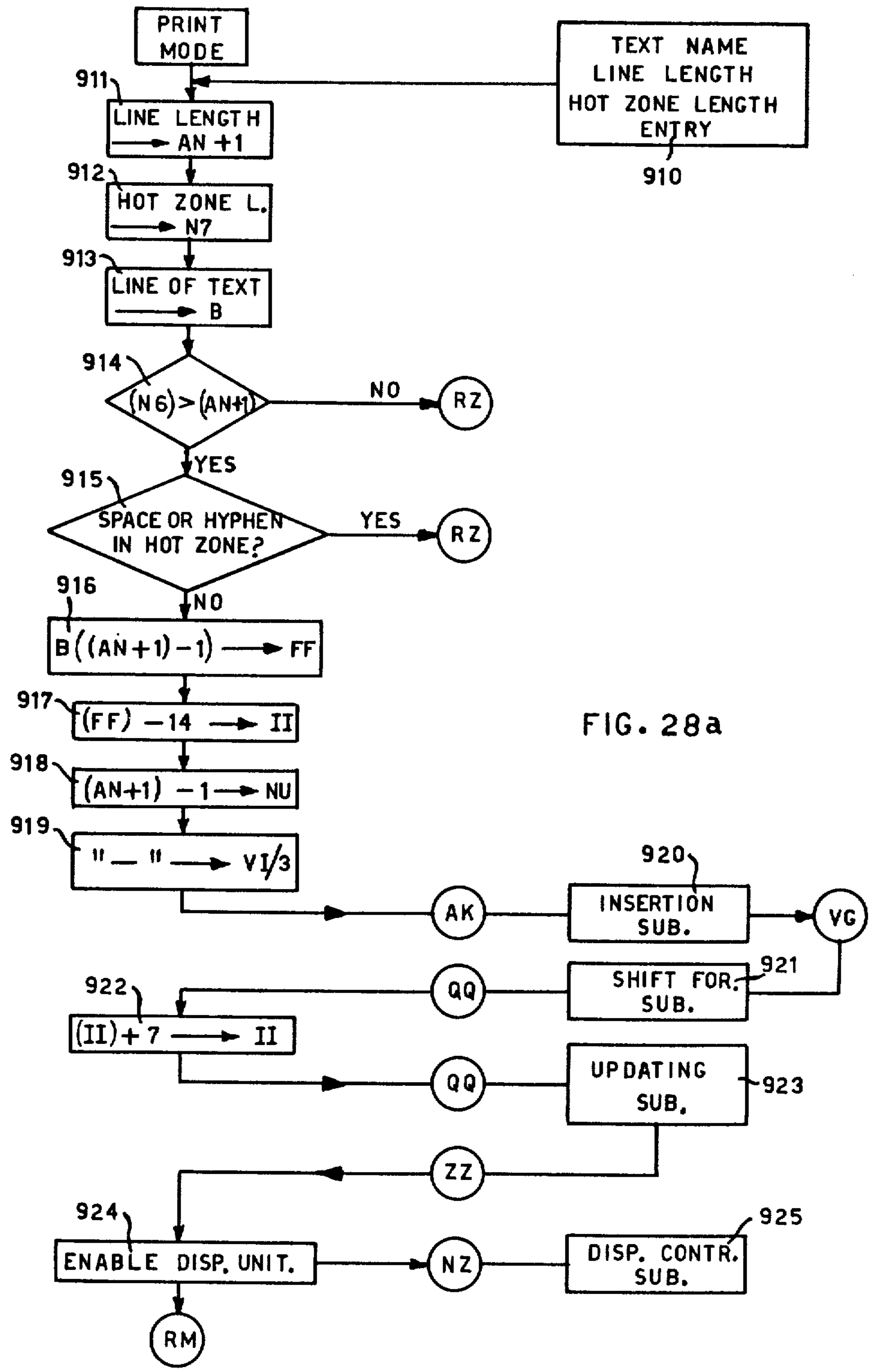
FIG. 28*a–b* is a flow chart of the hyphenation routine of the printing program.
Figure 28B:
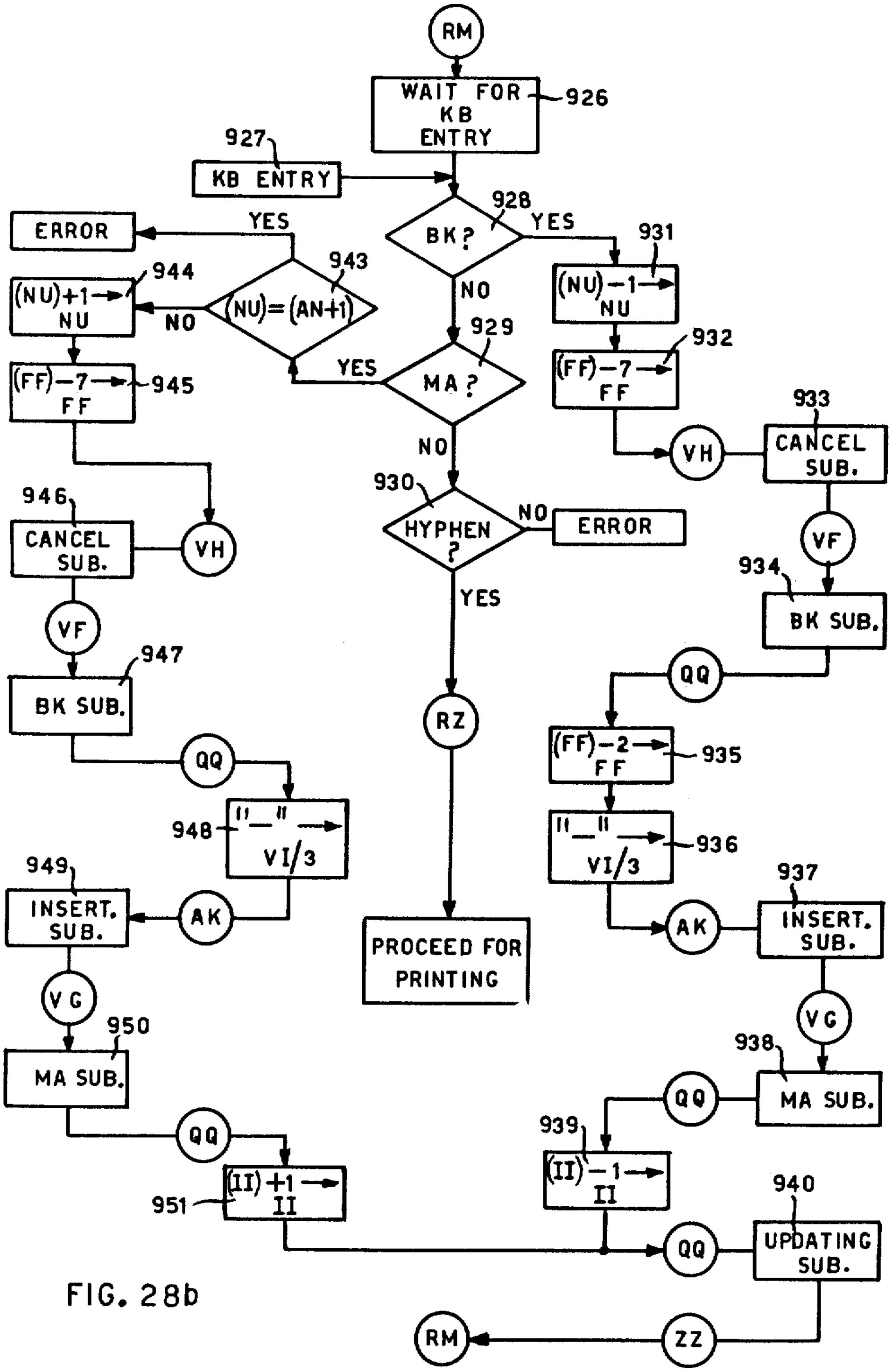

All the information entered into the system from the keyboard at the beginning of the printing state program (FIG. 28 a blocks 910) has a flow similar to that described for the recording program.

The desired line length in terms of number of the characters is stored in the cell AN+1 (block 941911).

The desired hot zone length is stored in the cell N 7 (block 912). Each line of the text to be printed is loaded from the magnetic memory 10 into the buffer 600, and the number of characters of the line is stored in the cell N. 6.

Before proceeding to the printing of the line of text, the printing program checks whether or not the number of characters of the line in process exceeds the desired line length. If so (logic fork 914 output YES), it checks whether a line section character such as an hypen or a space is present within the hot zone (logic block 915).

In the affirmative (output YES), the program executes a branch to the point RZ where it controls the operation relating to the printing of the text line up to the line section character within the end of line zone.

In the negative (logic fork 915 output NO), the print program starts the execution of an hyphenation routine which inserts an hyphen between two adjacent characters of the hot zone and displays it to the operator on the display 9.

More particularly, the address of the cell B((AN+1)−1) of the buffer 600 preceding that storing the last character is stored in the cell FF (block 916). The content of FF decremented by 14 is stored in the cell II (block 917) and the line length decremented by 1 is stored in the cell N U (block 918). Finally a hyphen code is stored in the cell VI/3 (block 919).

The character code insertion subroutine is then executed (block 920) followed by the shift forward execution subroutine (block 921) starting from point AK and ending at point QQ.

Contrary to the previously described operation of the recording program, in the print program, these subroutine are not immediately followed by the display buffer updating subroutine.

By the execution of blocks 920 and 921, a hyphen code is inserted in the last cell of the buffer 600 which is used for the desired line length.

Figure 29A:
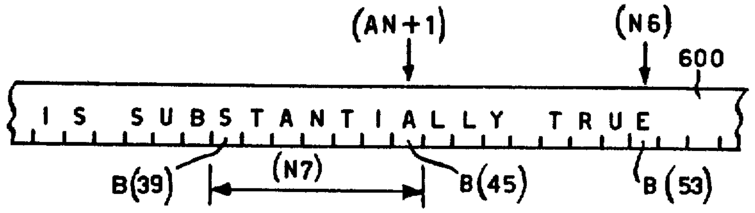
FIG. 29a–e show different contents of the buffer 600 and of the display buffer during the execution of the hyphenation routine.

FIG. 29*a* shows an example in which the desired line length is (AN+1)=45, the hot zone length is (N7)=7 the line in process stored in the buffer 600 has a length (N6)=53 characters, and the last text portion of the line is:

IS SUBSTANTIALLY TRUE with the character "A" stored in the cell B(45) and the character "S" stored in the cell B(39) which is the first cell of the hot zone.

After the execution of block 920 and 921 (FIG. 29*b*), an hyphen is stored in the cell B(45) between the characters "I" and "A". The hyphenation routine proceeds with the block 922 by incrementing the contents of the cell II by seven units and with the execution of the buffer display updating subroutine (block 923), and successive enabling of the display control unit (block 924) and execution of the display control subroutine (block 925). FIG. 29*c* shows the contents of the display buffer after the execution of the updating subroutine in the example above described. The display therefore visualizes the text portion

BSTANTI-ALLY TR with the hyphen displayed by the display cell V8.

The operator can confirm the proposed hyphenation by depressing the hyphen key "-" of the keyboard 7 or by varying the position of the hyphen by depressing the backspace key BK or also the shift forward MA key, (but only after a previous depression of the BK key).

The hyphenation routine waits for a code entered from the keyboard block (926) and when this happens (block 927), it checks which code has been entered (logic forks 928-930).

If the code entered is the BK code (logic fork 928 output YES), then the content by the cell NU is decremented of one unit and the content of the cell FF is decremented by seven units (blocks 932, 933). Then the cancel and backspace subroutines, already described, are executed (blocks 933, 934) whereby the hyphen is cancelled from the buffer 600.

Then the content of the cell FF is decremented by two units and on hyphen code is stored in the cell VI/3 (blocks 935, 936).

The insertion subroutine and the shift forward execution subroutine are then executed (blocks 937 and 938) so that the hyohen code is inserted in the cell of the buffer 600 preceding that which initially stored the hyphen code. (FIG. 29*d*).

Finally the content of the cell II is decremented by one (block 939) and the display buffer updating subroutine is executed (FIG. 29*e*) whereby, in the considered example, the display visualizes the text portion

UBSTANT-IALLY T with the hyphen again visualized by the cell V8. The depression of the key BK causes therefore a shift left of one place, over the hyphen, of the text portion displayed.

Then a branch to block 326 is executed to wait for another key entry. If the key MA is depressed (logic fork 929 output YES), then the subroutine checks whether the content of the cell NU is equal to the content of the cell AN+1 and, in the affirmative, a procedure error is signalled to the operator (logic fork 943 output yes) since it means that the operator has tried to shift the hyphen out of the desired line length.

In the negative, the content of the cell NU is incremented by one unit, the contents of the cell FF is decremented of seven units and the cancel backspace subroutines are executed in succession (blocks 994–947). Then an hyphen code is stored in the cell VI/3 and the insertion and shift forward subroutines are executed in succession whereby (blocks 948–950) the hyphen is cancelled from a cell of the buffer 600 and inserted in the following cell.

Figure 29B:
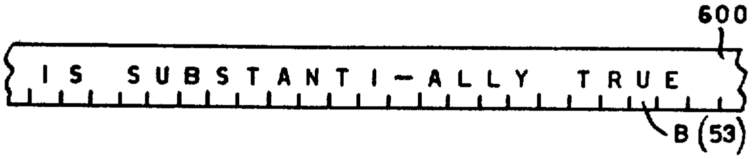
Figure 29C:
Figure 29D:
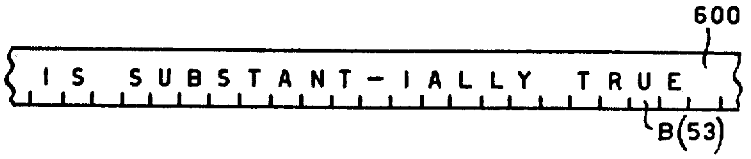
Figure 29E:

(If the MA Key is depressed after the BK Key in the above example, than the configuration of the buffer 600 after execution of block 950 is that of FIG. 29*b*).

Finally the content of the cell II is incremented by one unit and the display buffer updating subroutine is executed (blocks 951, 940) to visualize the shifting right of one place over the hyphen, fixed in the cell V8, of the text portion previously displayed. (FIG. 29*c* in the considered example).

Then the routine returns to block 926 to wait for a new key entry. If the code entered from the keyboard is not MA, BK or "-", then a procedure error is signalled to the operator.

It appears therefore clear from the above description that the hyphenation routine of the printing program provides a display to the operator on the display 9 of hyphenation obtained by inserting an hyphen in the last printable position of the line and alters or confirms such hyphen position interacting with by the operator through keyboard 7 and display 9.

What I claim is:

1. A text processing system comprising:

manual input means responsive to an operator for entering text information, including alphanumeric characters such as space and hyphen characters, and format information, including printing line length, right hand margin and right hand margin zone length for a line of text, in the system;

storage means including recording means for recording and reading information on a recording medium;

printing means for printing lines of text according to the text and format information entered by said manual input means;

a display unit having the capacity of displaying at least a portion of a line of text; and a control unit including:

mode selecting means for selectively defining a record mode and a print mode of operation for the system;

storage control means operative in the record mode of operation for controlling said storage means to record the information entered by said manual input means on said recording medium of said recording means, on a line by line basis;

temporary storage means operative in the print mode of operation upon entry of the format information for temporarily storing a line of text;

read out means connected to said storage means and said temporary storage means for reading out text information from said recording medium and transferring the text information to said temporary storage means;

searching means, operative in the print mode of operation when the length of the line of text temporarily stored in said temporary storage means is greater than the printing line length entered by said manual input means, for searching for a space or hyphen character stored in the right hand margin zone of the line of text stored in said temporary storage means;

insertion means operative in the event said searching means does not find a space or hyphen character in the right hand margin zone of the line of text for automatically inserting a hyphen character in a predetermined position in the right hand margin zone of the line of text stored in said temporary storage means;

display control means for controlling said display unit to display at least the alphanumeric characters stored in said temporary storage means in the right hand margin zone of the line of text;

first manually operable means responsive to the operator and connected to said temporary storage means for altering the position in said temporary storage means of the inserted hyphen character within the right hand margin zone of the line of text;

actuating means responsive to each operation of said first manually operable means for actuating said display control means to control said display unit to thereby display the right hand margin zone of the line of text stored in said temporary storage means;

second manually operable means for enabling the operator to confirm the acceptance of the displayed position of the hyphen character; and print control means for controlling said printing means to print at least a portion of the line of text stored in said temporary storage means up to and including the hyphen character in the event either said searching means finds a space or hyphen in the right hand margin zone of the line of text or the operator confirms the position of the hyphen character with said second manually operable means.

2. A text processing system comprising:

keyboard means having a plurality of keys for entering a text sequency of alphanumeric characters into the system:

memory means for storing the text sequence of alphanumeric characters entered by said keyboard means:

printing means for printing a text line in response to the text sequence stored in said memory means, the text line having a maximum predetermined number of alphernumeic characters;

single line display means having a number of character displaying positions in a single display line for displaying a number of consecutively entered alphanumeric characters, including the last entered one, in the single display line, the number of character displaying positions being no greater than the maximum predetermined number of alphernumeric characters in the text line of said printing means;

print conditioning means connected to said printing means for conditioning said printing means to print the text line;

display control means responsive to each alphernumeric character entered at said keyboard means and stored in said memory means for controlling said display means to display the last entered alphernumeric character and the alphernumeric characters of the text sequence immediately preceding the last entered alphernumeric character, said display control means being operative to control said display means before said print conditioning means conditions said printing means to print the text line; and indicating means for indicating in said single line display means the character displaying position corresponding to the last entered alphanumeric character.

3. A text processing system comprising:

a keyboard for entering alphanumeric characters into the system;

a line memory for storing the entered characters in accordance with the order of a selected sequence for forming a line of text;

a printing memory for storing a line of text to be printed;

a selective printing unit for printing the line of text stored in said printing memory, said selective printing unit having the capacity of printing a line of text having a maximum predetermined number of characters;

a single line display unit for displaying a number of characters in a single display line, the number of characters not exceeding the maximum predetermined number of characters in a line of text of said selective printing unit;

a display memory for storing the characters to be displayed by said single line display unit;

a central control unit for controlling the operation of said keyboard, said selective printing unit and said single line display unit, said central control unit including updating means operative each time a character entered from said keyboard is stored in said line memory for updating said display memory by storing therein the just entered character and a sufficient number of characters preceding the one just entered in the selected sequence to fill said single line display unit;

indicating means for indicating in said single line display unit the just entered character;

signal means for generating an end of line signal to transfer the text line stored in said line memory into said printing memory; and print control means connected to said printing unit for enabling said printng unit to print the text line stored in said printing memory.

4. A text processing system comprising:

a keyboard having a plurality of keys for entering alphanumeric characters into the system in a selected sequence to form a line of text to be printed;

a line memory having a predetermined number of ordered storage locations, each storage location storing an alphanumeric character;

pointer means for storing information identifying a storage location in said line memory;

updating means operative upon entry of an alphanumeric character by said keys of the keyboard for updating the contents of said pointer means to identify the storage location of a higher order storage location of said line memory immediately following the storage location previously identified;

storing means for storing each character entered by said keys of the keyboard in the storage location of said line memory identified by said pointer means to thereby store the line of text entered by said keys of the keyboard in said line memory;

a single line display unit for displaying only a portion of the line of text stored in said line memory, said single line display unit having the capacity to display a number N2 of alphanumeric characters which is less than the predetermined number of storage locations in said line memory;

the first display control means for controlling said display unit to display the maximum number N2 of characters in the line of text stored in the storage locations of said line memory, wherein the maximum number N2 of characters displayed includes the character stored in the last storage location identified by said pointer means and a maximum number (N2-1) of characters stored in the consecutive lower order storage locations immediately preceding the last identified storage location; and a selective printing unit coupled to said line memory for printing the line of text stored in said line memory in a printing line.

5. A text processing system according to claim 4 further comprising second display means for displaying numeric characters corresponding to the information stored in said pointer means.

6. A text processing system according to claim 5 further comprising:

a printing memory for storing a line of text to be printed;

signal means for generating an end of line signal at the completion of entry of a line of text;

transfer means responsive to one end of line signal for transfering the line of text stored in said line memory into said printing memory;

print control means connected to said printing unit for enabling said printing unit to print the line of text stored in said printing memory; and means responsive to said end of line signal for forcing information in said pointer means, identifying the lowest order location of said line memory.

7. A text processing system according to claim 5 further comprising:

signal means for generating an end of line signal at the completion of entry of a line of text; and conditioning means responsive to the end of line signal for conditioning said printing unit to print the entered line of text stored in said line memory.

8. A text processing system according to claim 7 further comprising means responsive to said end of line signal for forcing information in said pointer means identifying the lowest order position of said line memory.

9. A text processing system according to claim 4 further comprising:

a backspace key in said keyboard for entering a backspace signal into the system;

control means responsive to said backspace signal for storing information in said pointer means identifying the lower order location of said line memory immediately preceding the location previously identified by said pointer means.

10. A text processing system according to claim 4 further comprising:

a shift forward key in sad keyboard for entering a shift forward signal into the system; and control means responsive to said shift forward signal for storing in information in said pointer means identifying the higher order location of said line memory immediately following the location previously identified by said pointer.

11. A text processing system according to claim 4 further comprising:

a cancel key in said keyboard for entering a cancel signal into the system; and control means responsive to said cancel signal for shifting the contents of each location of the line memory having a higher order than the location identified by said pointer into the corresponding adjacent lower order location.

12. A text processing system according to claim 4 further comprising:

checking means operative upon entry of a character from the keyboard for checking whether a location of higher order immediately following the location identified by the pointer has a character stored therein and for generating, in the affirmative, an insertion signal; and shifting means responsive to the insertion signal and operative before the operation of said storing means for shifting the contents of each location having higher order than the location identified by said pointer means into the next following higher order location.

13. A text processing system according to claim 4 further comprising:

an auxiliary memory having a plurality of ordered storage locations for storing a line of text;

signal means for generating an end of line signal at the completion of entry of a line of text in said line memory;

transferring means responsive to the end of line signal for transferring the line of text stored in said line memory into said ordered storage locations of said auxiliary memory;

a preceding line key on said keyboard for entering a preceding line signal into the system; and second display control means responsive to the preceding line signal for controlling said single line display unit to display a maximum number N2 of characters of the line of text stored in said auxiliary memory starting with the lowest order storage location of said auxiliary memory.

14. A text processing system according to claim 13 further comprising means responsive to said preceding line signal for disabling the alphanumeric keys of said keyboard.

15. A text processing system according to claim 4 further comprising:

means for generating an end of line signal at the completion of entry of a line of text in said line memory;

a magnetic storage unit connected to the system for storing text; and means responsive to said end of line signal for recording the line of text stored in said line memory into said magnetic storage unit.

16. A text processing system having a keyboard for enabling an operator to enter text information and format information to edit the text information into the system, said system comprising:

a storage unit for storing the text information entered into the system;

a single line display unit having a pair of opposite margins and the capacity to display a single line of information;

conditioning means for conditioning the system into a format entry mode of operation when the operator enters format information according to a predetermined sequence on said keyboard;

control means for controlling said single line display unit, during said format entry mode, to display predetermined message information for the operator, the message information being aligned with one of said pair of opposite margins of said single line display unit; and updating means responsive to each entry of text information from the keyboard for updating the display unit to display the last entered text information in a single line wich is aligned with the other one of said pair of opposite margins of said single line display unit.

17. A text processing system comprising:

a keyboard for entering alphanumeric characters in the system in a selected sequence to form a line of text as it is entered at said keyboard;

a line memory for temporarily storing the line of text entered at said keyboard;

an auxiliar memory for temporarily storing the preceding line of text;

a single line display unit having the capacity to display a line of text in a single display line;

first means for controlling said single line display unit in a first mode of operation to display at least the last entered portion of the line of text stored in said line memory;

a preceding line key in said keyboard for entering a preceding line signal into the system; and second means responsive to said preceding line signal for controlling said single line display unit in a second mode of operation to display at least the initial portion of the line of text stored in said auxiliary memory.

18. A text processing system comprising:

manual input means for enabling an operator to enter alphanumeric characters, including space and hyphen characters, in a selected sequence to form a line of text to be printed;

format entering means for entering format information defining a right hand margin, a right hand margin zone, and the length of the line of text to be printed;

a memory for temporarily storing an entered line of text to be printed;

searching means, operative when the length of the line of text stored in said memory is greater than the defined length of the line of text to be printed, for searching for a space or hyphen character to be printed in the defined right hand margin zone of said memory;

insertion means operative in the event said searching means does not find a space or hyphen character in the defined right hand margin zone for automatically inserting a hyphen character in a predetermined printing position in the defined right hand margin zone;

a display unit having the capacity of displaying at least a portion of the line of text to be printed;

control means for controlling said display unit to display at least the portion of the line of text stored in said memory in correspondence with the right hand margin zone;

first manually operable means connected to said memory for altering the positon in said memory of said inserted hyphen character within the right hand margin zone to correctly hyphenate the end of the line of text to be printed;

second manually operable means for enabling the operator to confirm the displayed position of the hyphen;

printing means for printing the characters of the line of text stored in said line memory, up to and including the hyphen character, in a single printing line; and conditioning means connected to said printing means for conditioning said printing mean to print the line of text in the event either said searching means finds a space or hyphen in the ight hand margin zone or the operator confirms the position of the hyphen with said second manually operable means.

* * * * *